(12) United States Patent
Takami et al.

(10) Patent No.: US 8,506,451 B2
(45) Date of Patent: Aug. 13, 2013

(54) VEHICLE DRIVE DEVICE

(75) Inventors: Shigeki Takami, Anjo (JP); Tomoo Atarashi, Kariya (JP); Yoshihisa Yamamoto, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 6 days.

(21) Appl. No.: 13/439,461

(22) Filed: Apr. 4, 2012

(65) Prior Publication Data

US 2012/0270697 A1 Oct. 25, 2012

(30) Foreign Application Priority Data

Apr. 20, 2011 (JP) ................................. 2011-094321

(51) Int. Cl.
*B60W 10/02* (2006.01)
*B60W 10/08* (2006.01)
*B60W 10/04* (2006.01)
*H02P 15/00* (2006.01)
*H02P 17/00* (2006.01)

(52) U.S. Cl.
USPC ........................... 477/5; 477/6; 477/8; 477/20

(58) Field of Classification Search
USPC ................................................. 477/5, 6, 8, 20
See application file for complete search history.

(56) References Cited

U.S. PATENT DOCUMENTS

| | | | | |
|---|---|---|---|---|
| 7,953,538 B2 * | 5/2011 | Matsubara et al. | ............. | 701/99 |
| 8,190,317 B2 * | 5/2012 | Kim et al. | ........................ | 701/22 |
| 8,271,178 B2 * | 9/2012 | Matsubara et al. | ............. | 701/79 |
| 2007/0256871 A1 | 11/2007 | Kaneko et al. | | |
| 2011/0212809 A1 | 9/2011 | Tsutsui et al. | | |

FOREIGN PATENT DOCUMENTS

| | | |
|---|---|---|
| JP | A-2006-105288 | 4/2006 |
| JP | A-2010-076678 | 4/2010 |
| JP | A-2011-179559 | 9/2011 |
| JP | A-2012-52639 | 3/2012 |

OTHER PUBLICATIONS

Jun. 12, 2012 International Search Report issued in International Patent Application No. PCT/JP2012/058179 (with translation).

* cited by examiner

*Primary Examiner* — Tisha Lewis
(74) *Attorney, Agent, or Firm* — Oliff & Berridge, PLC

(57) ABSTRACT

A vehicle drive including an input coupled to an engine, an output coupled to wheels, an intermediate member between the input and output and coupled to a rotary electric machine, a friction engagement device between the input and intermediate member, and a control device. The control device, when starting the engine with the friction engagement device disengaged, engages the friction engagement device when a rotational speed difference between the input and intermediate member is equal to or less than a predetermined value; raises a rotational speed of the input using the rotary electric machine with the friction engagement device engaged to start the engine; and, when a rotational speed of the engine is equal to or more than a predetermined value, reduces an engagement pressure of the friction engagement device and the friction engagement device is returned to the engaged state when the rotational speed difference reaches a threshold.

12 Claims, 10 Drawing Sheets

F I G . 1
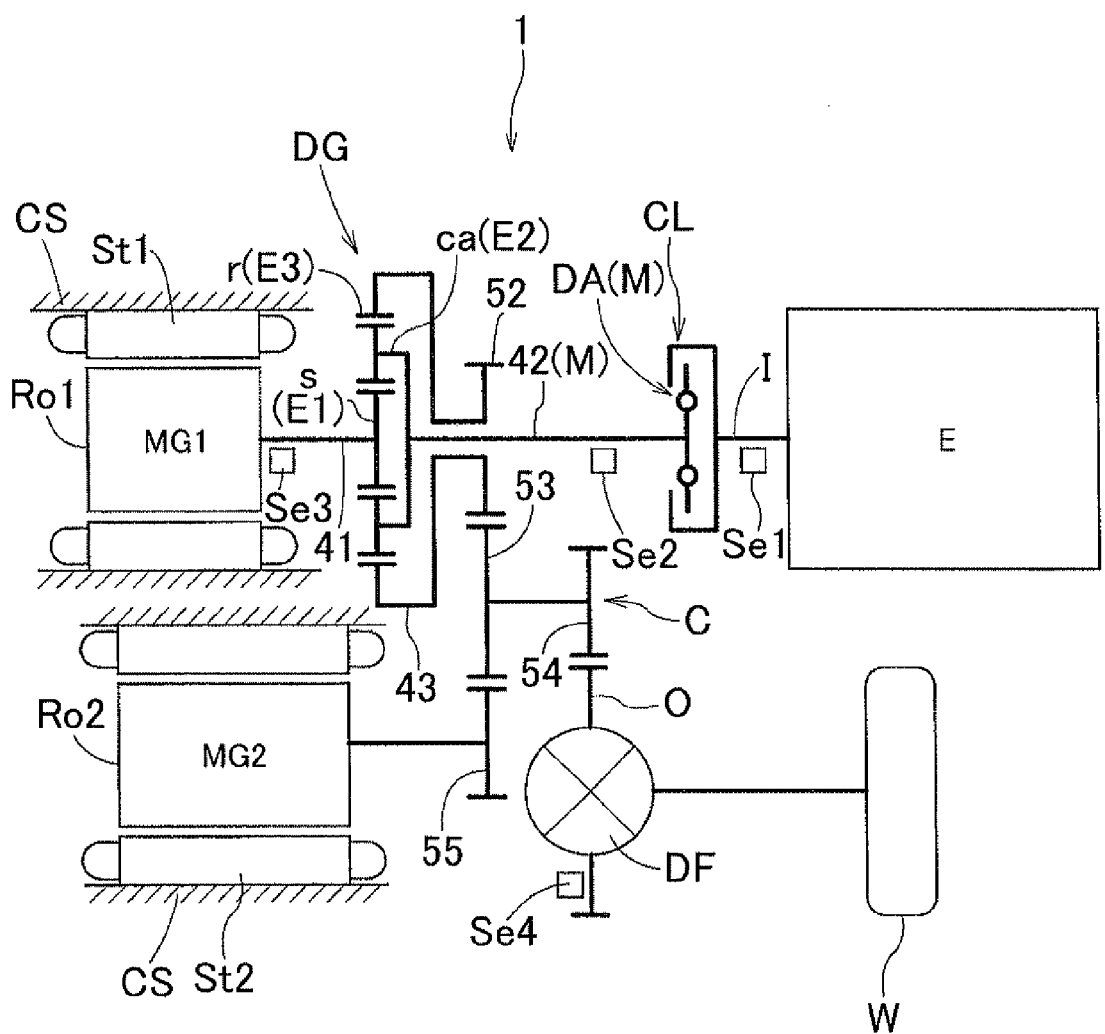

"VEHICLE DRIVE DEVICE

INCORPORATION BY REFERENCE

The disclosure of Japanese Patent Application No. 2011-094321 filed on Apr. 20, 2011 including the specification, drawings and abstract is incorporated herein by reference in its entirety.

BACKGROUND OF THE INVENTION

The present invention relates to a vehicle drive device including an input member drivably coupled to an internal combustion engine, an output member drivably coupled to wheels, an intermediate member provided on a power transfer path connecting between the input member and the output member and drivably coupled to a rotary electric machine, a friction engagement device capable of releasing drivable connection between the input member and the intermediate member, and a control device.

DESCRIPTION OF THE RELATED ART

An example of the vehicle drive device described above according to the related art is described in Japanese Patent Application Publication No. 2010-76678 (paragraphs 0075, 0076, etc.) mentioned below. The device according to Japanese Patent Application Publication No. 2010-76678 further includes a differential gear device including three rotary elements, namely a sun gear drivably coupled to a first rotary electric machine, a carrier drivably coupled to the intermediate member, and a ring gear drivably coupled to a second rotary electric machine and the output member. The device is provided with an electric travel mode in which the vehicle is run using torque of the second rotary electric machine with the internal combustion engine stationary, and a split travel mode (a type of a hybrid travel mode) in which the vehicle is run with torque of the internal combustion engine distributed to the first rotary electric machine and the output member.

In the device according to Japanese Patent Application Publication No. 2010-76678), in order to improve the energy efficiency during travel in the electric travel mode, the friction engagement device which disconnects the internal combustion engine from the wheels is provided between the intermediate member and the input member drivably coupled to the internal combustion engine. To make mode switching from the electric travel mode to the split travel mode, the rotational speed of the first rotary electric machine is controlled and the rotational speed difference between engagement members on both sides of the friction engagement device is brought to zero to establish synchronized engagement, and thereafter the rotational speed of the first rotary electric machine is raised to start the internal combustion engine. This makes it possible to suppress generation of shock during engagement of the friction engagement device, and to maintain the durability of friction materials at a favorable level.

In the electric travel mode in which the internal combustion engine is stationary, the rotational speed of the rotary member (here, the input member) coupled to one of the engagement members of the friction engagement device is zero, and thus the rotational speed of the rotary member (here, the intermediate member) coupled to the other engagement member is also zero during synchronized engagement. Therefore, the rotary members on both sides of the friction engagement device may become eccentric with respect to each other, because the axis adjustment function due to rotation of the rotary members themselves may not be activated, depending on their shaft support structure. If the friction engagement device were engaged into a directly engaged state with the rotary members in such an eccentric state, the rotary members on both sides of the friction engagement device would be engaged with each other while being eccentric with respect to each other. If the vehicle were continuously run with the rotary members with the eccentric state maintained, the load acting on bearings that support the rotary members might become larger.

SUMMARY OF THE INVENTION

In view of the foregoing, it is desirable to provide a vehicle drive device that can suppress continuation of an eccentric state of rotary members on both sides of a friction engagement device while suppressing generation of shock during engagement of the friction engagement device along with start of an internal combustion engine.

A first aspect of the present invention provides a vehicle drive device including an input member drivably coupled to an internal combustion engine, an output member drivably coupled to wheels, an intermediate member provided on a power transfer path connecting between the input member and the output member and drivably coupled to a first rotary electric machine, a friction engagement device capable of releasing drivable connection between the input member and the intermediate member, and a control device. In the vehicle drive device, the control device includes: a synchronized engagement control section that, when an internal combustion engine start condition for starting the internal combustion engine which has been stationary is established with the friction engagement device in a disengaged state, engages the friction engagement device in a synchronized state, in which a rotational speed difference between the input member and the intermediate member is equal to or less than a predetermined value, to bring the friction engagement device into a directly engaged state; a start control section that raises a rotational speed of the input member using torque of the first rotary electric machine with the friction engagement device in the directly engaged state to start the internal combustion engine; and an alignment control section that, in an internal combustion engine rotating state in which a rotational speed of the internal combustion engine is equal to or more than a predetermined value, performs alignment operation in which an engagement pressure of the friction engagement device is reduced and in which the friction engagement device is returned to the directly engaged state upon detecting that the rotational speed difference reaches a rotation difference threshold.

The terms ""drivably coupled"" and ""drivable connection"" as used herein refer to a state in which two rotary elements are coupled to each other in such a way that enables transfer of a drive force, which includes a state in which the two rotary elements are coupled to each other to rotate together with each other, and a state in which the two rotary elements are coupled to each other via one or two or more transmission members in such a way that enables transfer of a drive force. Examples of such transmission members include various members that transfer rotation at an equal speed or a changed speed, such as a shaft, a gear mechanism, a belt, and a chain. Additional examples of such transmission members include engagement elements that selectively transfer rotation and a drive force, such as a friction engagement element and a meshing-type engagement element. In the case where respective rotary elements of a differential gear device are ""drivably coupled"" to each other, however, it is intended that three or more rotary elements provided in the differential gear device"

are drivably coupled to each other via no other rotary element. The term "drive force" is used as a synonym for "torque".

The term "rotary electric machine" as used herein refers to any of a motor (electric motor), a generator (electric generator), and a motor generator that functions both as a motor and as a generator as necessary.

The term "directly engaged state" means a state in which engagement members on both sides of a friction engagement device are engaged with each other to rotate together with each other. The term "disengaged state" means a state in which rotation or torque is not transferred between engagement members on both sides of a friction engagement device.

According to the first aspect of the present invention, the friction engagement device is engaged in the synchronized state, in which the rotational speed difference between the input member and the intermediate member is equal to or less than a predetermined value, when the internal combustion engine start condition is established. Thus, it is possible to suppress generation of shock during engagement of the friction engagement device.

Here, during synchronized engagement of the friction engagement device, which is performed with the internal combustion engine stationary, the respective rotational speeds of the input member and the intermediate member on both sides of the friction engagement device are zero, and the input member and the intermediate member may be eccentric with respect to each other. In this respect, according to the characteristic configuration described above, the engagement pressure of the friction engagement device is reduced to temporarily reduce the restraining force due to the engagement pressure after it is confirmed that the rotational speed of the internal combustion engine becomes equal to or more than the predetermined value, and the friction engagement device is returned to the directly engaged state again after detecting that the predetermined rotational speed difference is caused between the input member and the intermediate member. This makes it possible to temporarily relax the restraining force for the respective radial positions of the input member and the intermediate member, and to activate the axis adjustment function due to rotation of the input member and the intermediate member during that period. This makes it possible to suppress continuation of an eccentric state of the input member and the intermediate member which are located on both sides of the friction engagement device.

The alignment control section may perform the alignment operation after torque of the internal combustion engine becomes equal to or more than a predetermined value.

According to the configuration, the alignment operation can be performed with the internal combustion engine in self-sustained operation, and continuation of an eccentric state of the input member and the intermediate member which are located on both sides of the friction engagement device can be appropriately suppressed utilizing rotation and torque of the internal combustion engine.

The control device may further include a first rotary electric machine control section that, in starting the internal combustion engine, performs rotational speed control in which a command for a target rotational speed is provided to the first rotary electric machine to make a rotational speed of the first rotary electric machine coincide with the target rotational speed, and the alignment control section may detect torque inversion in which a direction of torque of the first rotary electric machine is inverted during execution of the rotational speed control for the first rotary electric machine to start the alignment operation at the same time as detection of the torque inversion.

When the internal combustion engine is started using torque of the first rotary electric machine, torque of the internal combustion engine is transferred to the first rotary electric machine. In this event, the rotational speed of the first rotary electric machine is urged to be raised or reduced in accordance with the drivable connection between the internal combustion engine and the first rotary electric machine. In the configuration described above, meanwhile, the first rotary electric machine is subjected to the rotational speed control. Thus, in order to make the rotational speed of the first rotary electric machine coincide with the predetermined target rotational speed, the first rotary electric machine outputs torque in the opposite direction to that at the time of start of the internal combustion engine. That is, the direction of torque of the first rotary electric machine is inverted between before and after start of the internal combustion engine. Hence, it is possible to appropriately determine the time point when torque of the internal combustion engine becomes equal to or more than the predetermined value by detecting torque inversion in which the direction of torque of the first rotary electric machine is inverted.

Torque of the first rotary electric machine becomes zero at the moment when torque of the first rotary electric machine is inverted. Therefore, by adopting a configuration in which the alignment operation is started at the same time as detection of torque inversion, it is possible to suppress occurrence of fluctuations in respective rotational speeds of the first rotary electric machine and the intermediate member drivably coupled to the first rotary electric machine when the engagement pressure of the friction engagement device is reduced during the alignment operation. It is also possible to suppress occurrence of fluctuations in rotational speed of the internal combustion engine when the engagement pressure of the friction engagement device is raised again to return the friction engagement device to the directly engaged state. Hence, it is possible to suppress an uncomfortable feeling to be given to a passenger of the vehicle.

The vehicle drive device may further include a differential gear device including a first rotary element, a second rotary element, and a third rotary element in the order of rotational speed; the first rotary electric machine may be drivably coupled to the first rotary element, the intermediate member may be drivably coupled to the second rotary element, and the output member may be drivably coupled to the third rotary element, via no other rotary element of the differential gear device; the control device may further include a torque maintenance control section that outputs a torque maintenance command for the first rotary electric machine and the internal combustion engine to maintain torque of the first rotary electric machine and torque of the internal combustion engine at respective constant values that are not varied over time; and the alignment control section may perform the alignment operation with both torque of the first rotary electric machine and torque of the internal combustion engine maintained at the respective constant values.

Herein, a differential gear mechanism including three rotary elements such as a planetary gear mechanism including a sun gear, a carrier, and a ring gear is used, and the differential gear mechanism alone, or a device obtained by combining a plurality of differential gear mechanisms with each other, is referred to as a "differential gear device".

The term "order of rotational speed" may refer to either of an order from the high speed side to the low speed side and an order from the low speed side to the high speed side, depending on the rotating state of each differential gear mechanism. In either case, the order of the rotary elements is invariable. That is, the expression "in the order of rotational speed"

means "in the descending or ascending order of rotational speed of the rotary elements in the rotating state". The "order of rotational speed" is equivalent to the order of arrangement of the rotary elements in a velocity diagram (collinear diagram). Here, the expression "order of arrangement of the rotary elements in a velocity diagram (collinear diagram)" refers to the order in which axes corresponding to the rotary elements are arranged in the velocity diagram.

According to the configuration, when the engagement pressure of the friction engagement device is reduced to reduce torque transferred via the friction engagement device with both torque of the first rotary electric machine and torque of the internal combustion engine maintained at respective constant values, the rotational speed of the first rotary electric machine is varied using torque of the first rotary electric machine. Hence, it is possible to appropriately detect a fact that the rotational speed difference between the input member and the intermediate member reaches the rotation difference threshold by detecting an event in which the rotational speed of the first rotary electric machine is varied. Thus, it is possible to easily determine termination of the alignment operation.

The vehicle drive device may further include a differential gear device including a first rotary element, a second rotary element, and a third rotary element in the order of rotational speed, and a second rotary electric machine; the first rotary electric machine is drivably coupled to the first rotary element, the intermediate member is drivably coupled to the second rotary element, and the output member and the second rotary electric machine are drivably coupled to the third rotary element, via no other rotary element of the differential gear device; the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed, and a second rotary electric machine control section that controls operation of the second rotary electric machine; the first rotary electric machine control section continuously executes the rotational speed control for the first rotary electric machine during the alignment operation; and the second rotary electric machine control section controls the second rotary electric machine such that torque transferred to the output member becomes torque corresponding to a required drive force for driving a vehicle, and controls the second rotary electric machine so as to correct variations in torque transferred to the output member along with the rotational speed control for the first rotary electric machine during the alignment operation.

According to the configuration, the first rotary electric machine is subjected to the rotational speed control performed by the first rotary electric machine during the alignment operation. Thus, when the engagement pressure of the friction engagement device is reduced to reduce torque transferred to the second rotary element of the differential gear device via the friction engagement device, the absolute value of torque of the first rotary electric machine transferred to the first rotary element is also decreased in order to maintain the rotational speed of the first rotary electric machine. As a result, torque transferred to the output member via the third rotary element of the differential gear device is decreased. In the configuration described above, however, the second rotary electric machine, which is controlled such that torque transferred to the output member becomes torque corresponding to the required drive force for driving the vehicle, is controlled so as to supplement torque transferred to the output member which has been decreased during the alignment operation. Thus, variations in torque of the output member can be suppressed. Hence, it is possible to suppress an uncomfortable feeling to be given to a passenger of the vehicle.

BRIEF DESCRIPTION OF THE DRAWINGS

FIG. 1 is a skeleton diagram showing the mechanical configuration of a vehicle drive device according to a first embodiment of the present invention;

DETAILED DESCRIPTION OF THE EMBODIMENTS

1. First Embodiment

Figure 3:
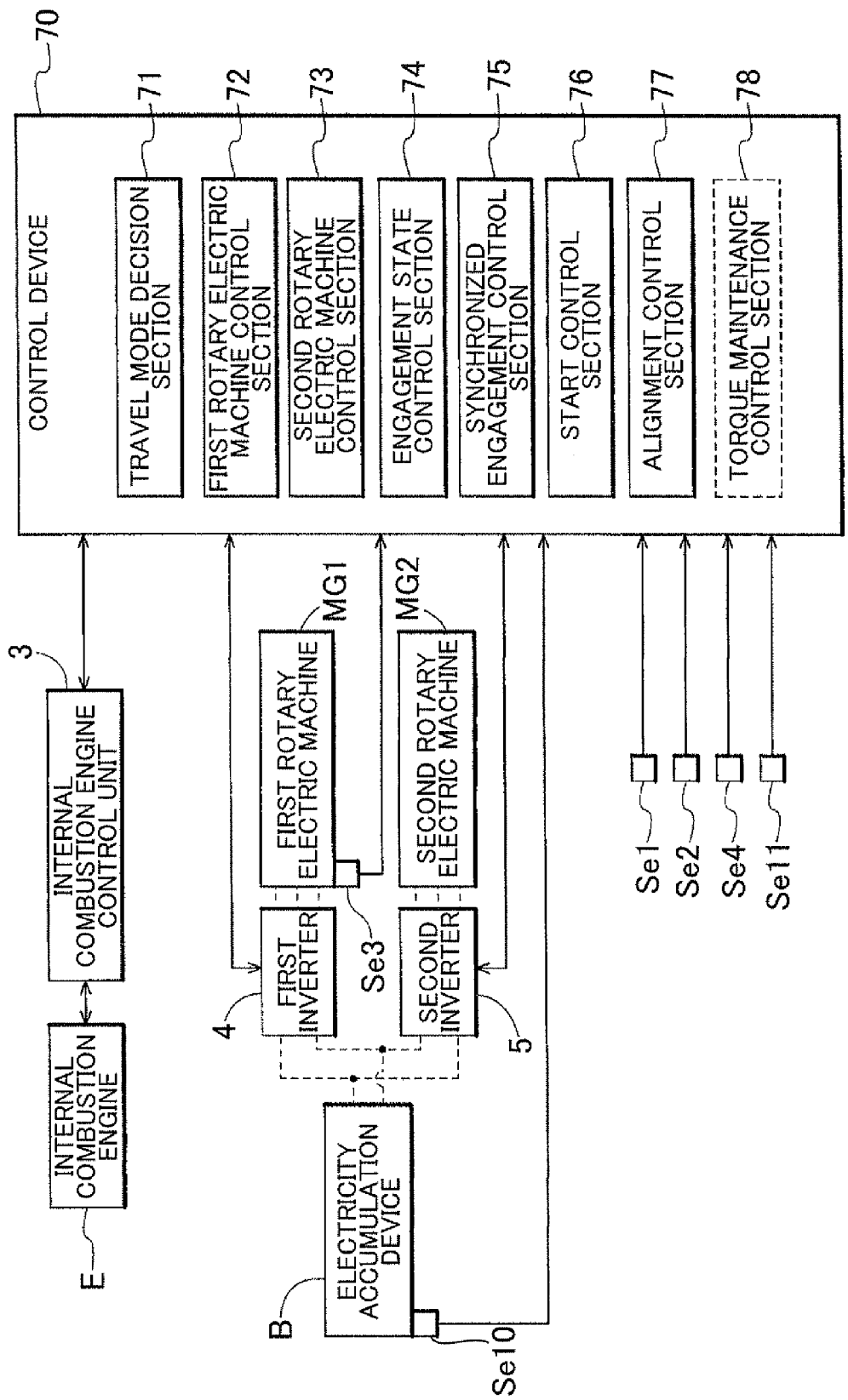
FIG. 3 is a schematic diagram showing the system configuration of vehicle drive device.

A vehicle drive device according to a first embodiment of the present invention will be described with reference to the drawings. As shown in FIG. 1, a vehicle drive device 1 according to the embodiment is a drive device (hybrid vehicle drive device) that drives a vehicle (hybrid vehicle) including an internal combustion engine E and rotary electric machines MG1 and MG2 each serving as a drive force source for wheels W. The vehicle drive device 1 according to the embodiment also includes a control device 70 (see FIG. 3). The control device 70 controls operation of the drive force sources and so forth on the basis of the system configuration shown in FIG. 3. In FIG. 3, broken lines each indicate a transfer path for electric power, and solid arrows each indicate a transfer path for various types of information.

In the embodiment, as shown in FIG. 1, a differential gear device DG provided in the vehicle drive device 1 is formed by a planetary gear mechanism including a sun gear s, a carrier ca, and a ring gear r each serving as a rotary element. The first rotary electric machine MG1 is drivably coupled to the sun gear s, a second coupling member 42 is drivably coupled to the carrier ca, and the second rotary electric machine MG2 and an output member O are drivably coupled to the ring gear r, via no other rotary element of the planetary gear mechanism. The second coupling member 42 is drivably coupled to the internal combustion engine E via a damper device DA and an input member I. The output member O is drivably coupled to the wheels W. In the embodiment, the second coupling member 42 and the damper device DA are drivably coupled to each other to rotate together with each other. The second coupling member 42 and the damper device DA form an "intermediate member M".

The vehicle drive device 1 further includes a friction engagement device CL capable of releasing the drivable connection between the intermediate member M and the input member I. The vehicle drive device 1 is provided with an electric travel mode in which the vehicle is run using torque of the second rotary electric machine MG2 with the internal combustion engine E stationary, and a hybrid travel mode (in the example, a split travel mode) in which the vehicle is run with torque of the internal combustion engine E distributed to the first rotary electric machine MG1 and the output member O. To make mode switching from the electric travel mode to the hybrid travel mode, control in which the friction engagement device CL is brought from a disengaged state into synchronized engagement and in which the internal combustion engine E is started using torque of the first rotary electric machine MG1 with the friction engagement device CL in a directly engaged state is executed.

In such a configuration, the vehicle drive device 1 according to the embodiment is characterized by being capable of executing predetermined alignment control in order to suppress continuation of an eccentric state of the intermediate member M and the input member I which are rotary members on both sides of the friction engagement device CL and which are subjected to synchronized engagement at a rotational speed of zero. The configuration of the vehicle drive device 1 according to the embodiment will be described in detail below.

1-1. Mechanical Configuration of Vehicle Drive Device

First, the mechanical configuration of the vehicle drive device 1 according to the embodiment will be described. The vehicle drive device 1 includes the input member I drivably coupled to the internal combustion engine E, the output member O drivably coupled to the wheels W, the first rotary electric machine MG1, the second rotary electric machine MG2, the intermediate member M provided on a power transfer path connecting between the input member I and the output member O and drivably coupled to the first rotary electric machine MG1, the differential gear device DG including at least three rotary elements, and the control device 70. The vehicle drive device 1 according to the embodiment is formed as a drive device for a hybrid vehicle of a so-called 2-motor split type including the differential gear device DG for power distribution which distributes torque of the internal combustion engine E to the first rotary electric machine MG1 side and the wheels W and second rotary electric machine MG2 side. The vehicle drive device 1 shown in FIG. 1 is suitable as a configuration to be mounted on FF (Front-Engine Front-Drive) vehicles, for example.

In the embodiment, as shown in FIG. 1, the differential gear device DG is formed by a planetary gear mechanism of a single pinion type. That is, in the example, the differential gear device DG includes three rotary elements, specifically the sun gear s, the carrier Ca, and the ring gear r. As discussed later, the intermediate member M, the output member O, and the first rotary electric machine MG1 are drivably coupled to different rotary elements of the differential gear device DG via no other rotary element of the differential gear device DG. In the example, the first rotary electric machine MG1 is drivably coupled to the sun gear s, the intermediate member M is drivably coupled to the carrier ca, and the output member O is drivably coupled to the ring gear r.

Figure 4:
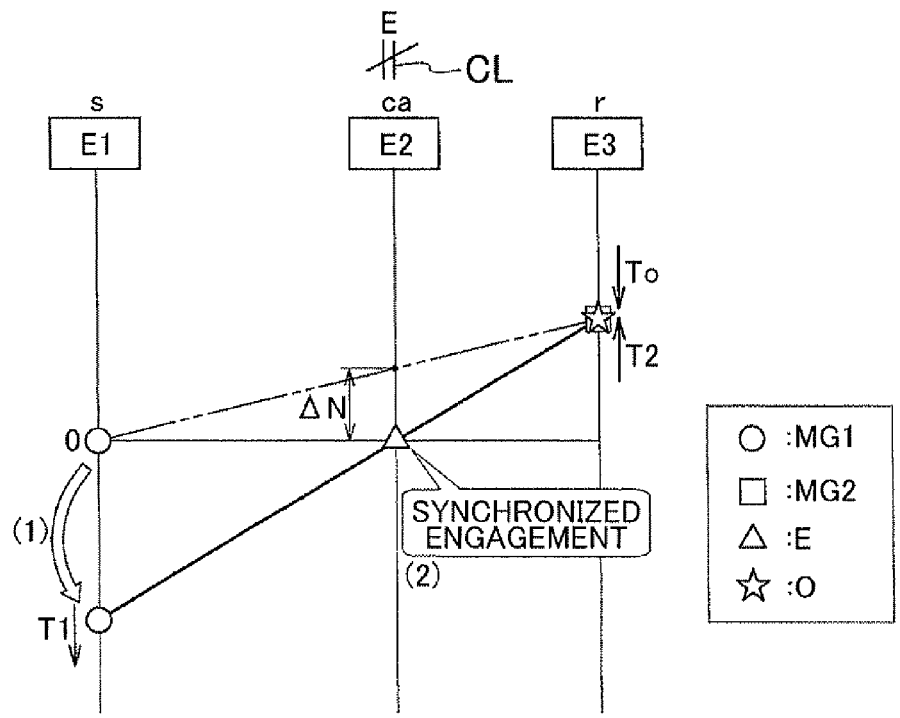
FIG. 4 is a velocity diagram illustrating synchronized engagement control.

The three rotary elements of the differential gear device DG are the sun gear s, the carrier ca, and the ring gear r in the order of rotational speed (see FIG. 4 etc.). The three rotary elements of the differential gear device DG are defined as a "first rotary element E1", a "second rotary element E2", and a "third rotary element E3" in the order of rotational speed. Then, in the embodiment, the first rotary element E1 is formed by the sun gear s, the second rotary element E2 is formed by the carrier ea, and the third rotary element E3 is formed by the ring gear r.

The second rotary electric machine MG2 is drivably coupled to a rotary element (in the example, the ring gear r serving as the third rotary element e3) of the differential gear device DG other than the first rotary element E1 (sun gear s) or the second rotary element E2 (carrier ca), via no other rotary element of the differential gear device DG. The vehicle drive device 1 includes the friction engagement device CL capable of releasing the drivable connection between the second rotary element E2 (carrier ca) and the intermediate member M and the input member I.

A coupling member is coupled to each of the rotary elements of the differential gear device DG to rotate together with that rotary element. Specifically, as shown in FIG. 1, a first coupling member 41 is coupled to the sun gear s, a second coupling member 42 forming the intermediate member M is coupled to the carrier ea, and a third coupling member 43 is coupled to the ring gear r. The first rotary electric machine MG1 is drivably coupled to the first coupling member 41 to be drivably coupled to the sun gear s. Thus, in the embodiment, the first rotary electric machine MG1 is drivably coupled to the second coupling member 42 forming the intermediate member M via the sun gear s and the carrier ca. In addition, the first rotary electric machine MG1 is drivably coupled to the second coupling member 42 forming the intermediate member M not via the friction engagement device CL. The input member I is drivably coupled to the second coupling member 42 via the friction engagement device CL and the damper device DA to be drivably coupled to the carrier ca. On the other hand, the input member I is drivably coupled to the internal combustion engine E not via the friction engagement device CL. The output member O and the second rotary electric machine MG2 are drivably coupled to the third coupling member 43 via a counter gear mechanism C and a counter drive gear 52 to be drivably coupled to the ring gear r.

The input member I is drivably coupled to the internal combustion engine E. In the embodiment, the input member I is formed by a shaft member (input shaft). Here, the internal combustion engine E is a motor that outputs power through combustion of fuel, and examples of the internal combustion engine E include spark-ignition engines such as a gasoline engine and compression-ignition engines such as a diesel engine. The input member I is drivably coupled to an internal combustion engine output shaft such as a crankshaft of the internal combustion engine E to rotate together with the internal combustion engine output shaft. Hence, the rotational speed of the input member I is equal to the rotational speed of the internal combustion engine E. In the embodiment, the input member I and the internal combustion engine E are drivably coupled to the intermediate member M via a power input section mainly formed by the friction engagement device CL and the damper device DA. The configuration of the power input section will be discussed in detail later.

The output member O is drivably coupled to the wheels W. In the embodiment, the output member O is formed by a gear member, specifically a differential input gear provided in an output differential gear device D. In the example, the output differential gear device D is formed by a differential gear mechanism that uses a plurality of bevel gears that mesh with each other, and distributes torque transferred to the output member O to the left and right wheels W serving as drive wheels.

The first rotary electric machine MG1 serving as the rotary electric machine includes a first stator St1 fixed to a case (drive device case) CS and a first rotor Ro1 supported radially inward of the first stator SU so as to be freely rotatable. The first rotor Ro1 is drivably coupled to the first rotary element E1 (in the example, the sun gear s) to rotate together with the first rotary element E1 via the first coupling member 41 serving as a first rotor shaft to which the first rotor Ro1 is fixed. The second rotary electric machine MG2 includes a second stator St2 fixed to the case CS and a second rotor Ro2 supported radially inward of the second stator St2 so as to be freely rotatable. The second rotor Ro2 is drivably coupled to a second rotary electric machine output gear 55 to rotate together with the second rotary electric machine output gear 55 via a second rotor shaft to which the second rotor Ro2 is fixed.

As shown in FIG. 3, the first rotary electric machine MG1 is electrically connected to an electricity accumulation device B via a first inverter 4, and the second rotary electric machine MG2 is electrically connected to the electricity accumulation device B via a second inverter 5. A battery, a capacitor, or the like may be used as the electricity accumulation device 13. In the embodiment, each of the first rotary electric machine MG1 and the second rotary electric machine MG2 can function both as a motor (electric motor) that is supplied with electric power from the electricity accumulation device B to generate power (torque) and as a generator (electric generator) that is supplied with power to generate electric power and supply the generated electric power to the electricity accumulation device B.

As shown in FIG. 1, the counter gear mechanism C is formed to include a first counter gear 53, a second counter gear 54, and a counter shaft that couples the first counter gear 53 and the second counter gear 54 to each other to rotate together with each other. The third coupling member 43 includes the counter drive gear 52 which meshes with the first counter gear 53. The second rotary electric machine MG2 is drivably coupled to the third rotary element E3 with the second rotary electric machine output gear 55 disposed to mesh with the first counter gear 53 at a position that is different in the circumferential direction (in the circumferential direction of the first counter gear 53) from the counter drive gear 52. The output member O is disposed to mesh with the second counter gear 54 to be drivably coupled to the third rotary element E3. That is, in the embodiment, the respective rotational speeds of the third rotary element E3, the second rotary electric machine MG2, and the output member O are proportional to each other, and the proportionality coefficient (that is, the rotational speed ratio) is determined in accordance with the number of teeth of gears interposed therebetween.

The vehicle drive device 1 configured as described above can execute a hybrid travel mode (split travel mode) in which the vehicle is run using both torque of the internal combustion engine E and torque of the rotary electric machines MG1 and MG2 and an electric travel mode in which the vehicle is run using only torque of the rotary electric machines MG1 and MG2 (in the example, only torque of the second rotary electric machine MG2). The travel modes will be discussed later.

1-2. Configuration of Power Input Section

Next, the specific configuration of the power input section will be described with reference to the FIG. 2. Here, the power input section is a mechanical section that transfers torque of the internal combustion engine E transferred to the input member I to the intermediate member M. The power input section may also transfer torque of the first rotary electric machine MG1 transferred to the intermediate member M to the input member I. In the embodiment, the power input section is mainly formed by the friction engagement device CL and the damper device DA. In the embodiment, the power input section also includes a flywheel 21.

Figure 2:
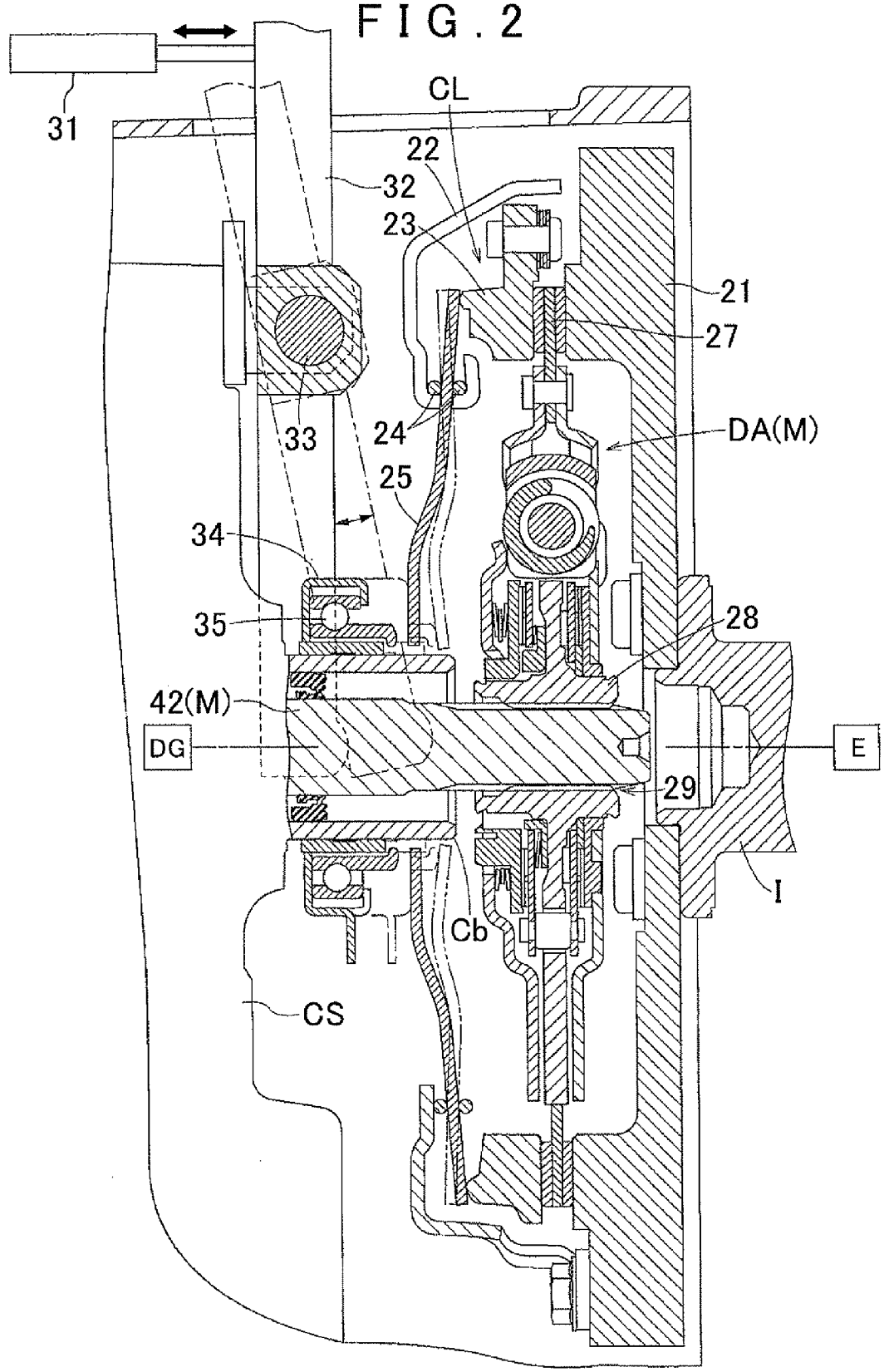
FIG. 2 is a partial cross-sectional view of the vehicle drive device.

In the embodiment, as shown in FIG. 2, the flywheel 21 formed in a circular plate shape is coupled to the input member I to rotate together with the input member I. A clutch cover 22 is fixed at a radially outer end portion of the flywheel 21 on the differential gear device DG side (on the left side in FIG. 2) in the axial direction. A pressure plate 23 formed in an annular shape and serving as a pressing member is disposed in a space defined by the flywheel 21 and the clutch cover 22. A radially outer end portion of a diaphragm spring 25 serving as an elastic member abuts against the pressure plate 23 from the side opposite to the flywheel 21 (from the differential gear device DG side). The diaphragm spring 25 is supported by a set of pivot rings 24 retained by the clutch cover 22. The diaphragm spring 25 can exert its elastic force to press the pressure plate 23 to the flywheel 21 side (to the right side in FIG. 2).

The friction engagement device CL is provided to switch on and off transfer of a drive force between the flywheel 21 and the damper device DA, and thus to selectively drivably couple the input member I and the intermediate member M to each other. The friction engagement device CL according to the embodiment is formed as a dry single-plate clutch mechanism including a clutch release mechanism formed by a release fork 32, the diaphragm spring 25, and so forth. In the embodiment, one end of the release fork 32 serving as a fork member is bifurcated into two branches disposed to interpose the second coupling member 42 therebetween. The release fork 32 is disposed along the radial direction of the second coupling member 42, and attached to the case CS so as to be swingable about a predetermined pivot shaft 33 serving as a fulcrum. A drive motor 31 serving as a drive force source for the clutch release mechanism of the friction engagement device CL is drivably coupled to a predetermined portion of the release fork 32 that is opposite to the second coupling member 42 with respect to the pivot shaft 33. The drive motor 31 is drivably coupled to the release fork 32 via a mechanism that converts rotational motion of the drive motor 31 into linear motion (for example, a mechanism formed by a ball screw and a nut). The drive motor 31 is driven using electric power of the electricity accumulation device B.

In the embodiment, a release bearing 35 serving as a clutch bearing is retained by a retainer 34 and is fitted around a cylindrical boss portion Cb formed on the case CS so as to surround the circumference of the second coupling member 42. The inner race of the release bearing 35 is disposed to be able to abut against a radially inner end portion of the diaphragm spring 25. The retainer 34 and the release bearing 35 are disposed more toward the flywheel 21 than the release fork 32, and may be pushed by the release fork 32 which swings about the pivot shaft 33 along with drive of the drive motor 31 to be moved toward the flywheel 21 along the boss portion Cb. In this state, the radially inner end portion of the diaphragm spring 25 is pressed toward the flywheel 21 to be displaced (see the state indicated by the double-dashed line in FIG. 2) so that pressing of the pressure plate 23 toward the flywheel 21 performed by the diaphragm spring 25 can be released.

A clutch disk 27 serving as a friction member integrally coupled to the damper device DA is disposed radially outwardly of the damper device DA and between the pressure plate 23 and the flywheel 21. The clutch disc 27 includes friction abutment portions that abut against the pressure plate 23 and the flywheel 21, respectively, and transfers a drive force to and from the flywheel 21 with the clutch disc 27 held at a predetermined engagement pressure between the pressure plate 23 and the flywheel 21. In the embodiment, the engagement pressure between the pressure plate 23 and the flywheel 21 can be controlled in accordance with the amount of displacement of the release fork 32 along with drive of the drive motor 31. In the example, the state indicated by the solid line in FIG. 2 is defined as a "minimally displaced state" in which the amount of displacement of the release fork 32 is minimum (zero), and the state indicated by the double dashed line in FIG. 2 is defined as a "maximally displaced state" in which the amount of displacement of the release fork 32 is maximum.

In the embodiment, with the release fork 32 in the minimally displaced state, the pressure plate 23 and the flywheel 21 and the clutch disc 27 and the damper device DA rotate together with each other to be able to transfer a drive force because of the elastic force of the diaphragm spring 25. In the embodiment, this state is referred to as a "directly engaged state" of the friction engagement device CL. With the release fork 32 in the maximally displaced state, on the other hand, the pressure plate 23 and the flywheel 21 and the clutch disc 27 and the damper device DA do not transfer rotation or a drive force. In the embodiment, this state is referred to as a "disengaged state" of the friction engagement device CL. Further, by appropriately controlling the amount of displacement of the release fork 32, the pressure plate 23 and the flywheel 21 and the clutch disc 27 and the damper device DA relatively rotate with respect to each other (with a rotational speed difference) to be able to transfer a drive force because of the elastic force of the diaphragm spring 25. In the embodiment, this state is referred to as a "slip engagement state" of the friction engagement device CL.

The damper device DA transfers rotation of the internal combustion engine output shaft to the second coupling member 42 while attenuating torsional vibration of the internal combustion engine output shaft transferred to the input member I with the friction engagement device CL in the directly engaged state. The damper device DA may be of various types known in the art. The damper device DA includes a cylindrical portion 28 at a radially inner end portion thereof, and spline grooves are formed in the inner peripheral surface of the cylindrical portion 28. The spline grooves of the cylindrical portion 28 engage with spline teeth formed on the outer peripheral surface of the second coupling member 42. That is, the damper device DA and the second coupling member 42 are drivably coupled to each other to rotate together with each other via a spline coupling portion 29. In the spline coupling portion 29, a predetermined clearance is provided between the inner peripheral surface of the cylindrical portion 28 and the outer peripheral surface of the second coupling member 42.

1-3. System Configuration of Vehicle Drive Device
1-3-1. Overall Configuration of System The system configuration of the vehicle drive device 1 according to the embodiment will be described. As shown in FIG. 3, the control device 70 according to the embodiment includes a travel mode decision section 71, a first rotary electric machine control section 72, a second rotary electric machine control section 73, an engagement state control section 74, a synchronized engagement control section 75, a start control section 76, and an alignment control section 77.

The control device 70 includes an arithmetic processing unit such as a CPU serving as a core, a storage device such as a RAM and a ROM, and so forth. The various functional sections of the control device 70 are formed by software (a program) stored in the ROM or the like, hardware such as a separately provided arithmetic circuit, or a combination of both. The functional sections are configured to exchange information between each other.

The control device 70 is configured to acquire information from sensors or the like provided in various portions of the vehicle incorporating the vehicle drive device 1 in order to acquire information on the various portions of the vehicle. Specifically, as shown in FIG. 3, the control device 70 is configured to acquire information from an input member sensor Se1, a second coupling member sensor Se2, a first coupling member sensor Se3, an output member sensor Se4, an electricity accumulation state sensor Se10, and an accelerator operation amount sensor Sell.

The input member sensor Se1 is a sensor that detects the rotational speed of the input member I. The second coupling member sensor Se2 is a sensor that detects the rotational speed of the second coupling member 42. In the example, the rotational speed of the second coupling member 42 detected by the second coupling member sensor Se2 is equal to the rotational speed of the second rotary element E2 (carrier ca) of the differential gear device DG. The first coupling member sensor Se3 is a sensor that detects the rotational speed of the first coupling member 41. In the example, the rotational speed of the first coupling member 41 detected by the first coupling member sensor Se3 is equal to the respective rotational speeds of the first rotary electric machine MG1 and the first rotary element E1 (sun gear s) of the differential gear device DG. The first coupling member sensor Se3 may be formed by a rotation sensor (such as a resolver) provided in the first rotary electric machine MG1, for example.

The output member sensor Se4 is a sensor that detects the rotational speed of the output member O. The control device 70 can derive the vehicle speed on the basis of the rotational speed of the output member O detected by the output member sensor Se4. It is only necessary for the output member sensor Se4 to detect the rotational speed of any member that rotates at a rotational speed that is proportional to the rotational speed of the output member O. Hence, a rotation sensor (such as a resolver) provided in the second rotary electric machine MG2, for example, may be suitably used as the output member sensor Se4. The accelerator operation amount sensor Sell is a sensor that detects the amount of operation of an accelerator pedal (not shown) to detect the accelerator operation amount. The electricity accumulation state sensor Se10 is a sensor that detects the state (such as accumulated electricity amount) of the electricity accumulation device B. In the embodiment, the electricity accumulation state sensor Se10 is formed by a voltage sensor, a current sensor, or the like, and detects the accumulated electricity amount by detecting SOC (state of charge).

As shown in FIG. 3, the vehicle includes an internal combustion engine control unit 3. The internal combustion engine control unit 3 controls various portions of the internal combustion engine E to control operation of the internal combustion engine E. The internal combustion engine control unit 3 controls operation of the internal combustion engine E by setting target torque and target rotational speed serving as control targets for torque and rotational speed of the internal combustion engine E and causing the internal combustion engine E to operate in accordance with the control targets. The target torque and the target rotational speed are set on the basis of a command from the control device 70. The internal combustion engine control unit 3 also starts the internal combustion engine E which has been in a stationary state (a state in which combustion is stopped) and brings the internal combustion engine E which has been started into a stationary state in accordance with a command from the control device 70.

1-3-2. Configuration of Travel Mode Decision Section

The travel mode decision section 71 is a functional section that decides a travel mode of the vehicle. The travel mode decision section 71 decides the travel mode to be established by the vehicle drive device 1 on the basis of the vehicle speed derived on the basis of the results of detection performed by the output member sensor Se4, the accelerator operation amount detected by the accelerator operation amount sensor Se11, and the electricity accumulation state detected by the electricity accumulation state sensor Se10, for example. In the embodiment, examples of the travel mode that can be decided by the travel mode decision section 71 include the hybrid travel mode and the electric travel mode. The travel mode decision section 71 references a mode selection map (not shown) stored in advance and defining the relationship between the vehicle speed, the accelerator operation amount, and the electricity accumulation state (accumulated electricity amount) and the travel mode to decide the travel mode.

The hybrid travel mode is a travel mode in which the vehicle is run using both torque of the internal combustion engine E and torque of the rotary electric machines MG1 and MG2. The hybrid travel mode according to the embodiment is the split travel mode, in which the friction engagement device CL is brought into the directly engaged state and in which torque of the internal combustion engine E transferred via the input member I and the intermediate member M is transferred to the output member O while being distributed to the first rotary electric machine MG1 through the differential gear device DG. In the hybrid travel mode, the internal combustion engine E outputs torque in the positive direction corresponding to the required drive force for driving the vehicle to transfer the torque to the second rotary element E2 of the differential gear device DG, while being controlled so as to be maintained in a state with high efficiency and low gas emission (a state with optimum fuel consumption characteristics). The first rotary electric machine MG1 functions to receive a reaction force of torque of the internal combustion engine E by outputting torque in the negative direction to transfer the torque to the first rotary element E1. Then, torque obtained by attenuating torque of the internal combustion engine E is transferred to the output member O drivably coupled to the third rotary element E3. The vehicle is thus run.

At this time, the first rotary electric machine MG1 basically makes positive rotation to generate electric power while outputting torque in the negative direction. The second rotary electric machine MG2 outputs torque in the positive direction as necessary to supplement torque transferred to the output member O. Depending on the vehicle speed, the first rotary electric machine MG1 may make negative rotation for power running while outputting torque in the negative direction, and the second rotary electric machine MG2 may generate electric power for driving the first rotary electric machine MG1. In the hybrid travel mode, the vehicle can be run while efficiently driving the internal combustion engine E and generating electricity utilizing large torque of the internal combustion engine E.

The electric travel mode is a travel mode in which the vehicle is run using only torque of the second rotary electric machine MG2 in the embodiment. In the electric travel mode, the friction engagement device CL is brought into the disengaged state, and only torque of the second rotary electric machine MG2 is transferred to the output member O with the internal combustion engine E stationary. In the electric travel mode, no torque is transferred via the first rotary element E1 or the second rotary element E2, and only torque of the second rotary electric machine MG2 drivably coupled to the third rotary element E3 is transferred to the output member O also drivably coupled to the third rotary element E3. The second rotary electric machine MG2 outputs torque corresponding to the required drive force to run the vehicle. In the embodiment, in the electric travel mode, the rotational speed of the first rotary electric machine MG1 is brought to generally zero, and the internal combustion engine E is disconnected from the wheels W with the friction engagement device CL in the disengaged state, which enables improvement in energy efficiency by avoiding idling (dragging) of the first rotary electric machine MG1.

According to the mode selection map of the embodiment, it is decided to transition into the hybrid travel mode in the case where an internal combustion engine start condition is established during travel in the electric travel mode. Here, the internal combustion engine start condition is a condition for starting the internal combustion engine E which has been stationary, and is established in the case where the vehicle requires torque of the internal combustion engine E. For example, the internal combustion engine start condition is established in the case where torque corresponding to the required drive force may not be obtained with only torque of the second rotary electric machine MG2 when a driver strongly depresses the accelerator pedal or the like while the vehicle is stationary or during travel in the electric travel mode. The internal combustion engine start condition is also established in the case where it has become necessary to charge the electricity accumulation device B by causing the first rotary electric machine MG1 to generate electricity using torque of the internal combustion engine E because the amount of electricity accumulated in the electricity accumulation device B is decreased to be equal to or less than a low electricity accumulation state determination threshold determined in advance. In the embodiment, when the internal combustion engine start condition is established, the synchronized engagement control section 75 and the start control section 76 cooperate with each other to start the internal combustion engine E using torque of the first rotary electric machine MG1. This will be discussed later.

Meanwhile, it is decided to transition into the electric travel mode in the case where an internal combustion engine stop condition for stopping the internal combustion engine E which has been driven is established during travel in the hybrid travel mode. Here, the internal combustion engine stop condition is established in the case where the vehicle no longer requires torque of the internal combustion engine E. In the embodiment, when the internal combustion engine stop condition is established, the friction engagement device CL is brought into the disengaged state, and thereafter the internal combustion engine E and the first rotary electric machine MG1 are brought into a stationary state (the respective rotational speeds of the first rotary electric machine MG1 and the internal combustion engine E are brought to zero).

1-3-3. Configuration of First Rotary Electric Machine Control Section

The first rotary electric machine control section 72 serving as the rotary electric machine control section is a functional section that controls operation of the first rotary electric machine MG1. Specifically, the first rotary electric machine control section 72 issues a command for target torque and target rotational speed serving as control targets for torque and rotational speed of the first rotary electric machine MG1, and controls the first inverter 4 such that the first rotary electric machine MG1 operates in accordance with the control targets. In the example, the first rotary electric machine control section 72 controls operation of the first rotary electric machine MG1 through torque control or rotational speed control. Here, the torque control is control in which a command for target torque for the first rotary electric machine MG1 is issued to make torque of the first rotary electric machine MG1 coincide with the target torque. Meanwhile, the rotational speed control is control in which a command for target rotational speed for the first rotary electric machine MG1 is issued to make the rotational speed of the first rotary electric machine MG1 coincide with the target rotational speed.

1-3-4. Configuration of Second Rotary Electric Machine Control Section

The second rotary electric machine control section 73 is a functional section that controls operation of the second rotary electric machine MG2. Specifically, the second rotary electric machine control section 73 issues a command for target torque and target rotational speed serving as control targets for torque and rotational speed of the second rotary electric machine MG2, and controls the second inverter 5 such that the second rotary electric machine MG2 operates in accordance with the control targets. In the example, the second rotary electric machine control section 73 controls operation of the second rotary electric machine MG2 through torque control or rotational speed control. Here, the torque control is control in which a command for target torque for the second rotary electric machine MG2 is issued to make torque of the second rotary electric machine MG2 coincide with the target torque. Meanwhile, the rotational speed control is control in which a command for target rotational speed for the second rotary electric machine MG2 is issued to make the rotational speed of the second rotary electric machine MG2 coincide with the target rotational speed.

In the embodiment, the second rotary electric machine control section 73 controls the second rotary electric machine MG2 such that torque transferred to the output member O becomes torque corresponding to the required drive force for driving the vehicle. In the hybrid travel mode, for example, in the case where a portion of torque of the internal combustion engine E that is transferred to the output member O via the differential gear device DG falls short of the required drive force, the second rotary electric machine control section 73 controls torque of the second rotary electric machine MG2 such that torque supplementing such a shortage in torque caused by torque of the internal combustion engine E is transferred to the output member O. In the electric travel mode, for example, the second rotary electric machine control section 73 controls torque of the second rotary electric machine MG2 such that torque coinciding with the required drive force is transferred to the output member O.

1-3-5. Configuration of Engagement State Control Section

The engagement state control section 74 is a functional section that controls the state of the friction engagement device CL. In the embodiment, the engagement state control section 74 controls the state of the friction engagement device CL by controlling operation of the drive motor 31 provided as the drive force source for the clutch release mechanism of the friction engagement device CL. In the example, the engagement state control section 74 controls the rotational speed and the drive time of the drive motor 31 to control the amount of displacement of the release fork 32, thereby controlling the engagement pressure of the friction engagement device CL to control the friction engagement device CL to one of the disengaged state, the directly engaged state, and the slip engagement state.

In the embodiment, the engagement state control section 74 controls the state of the friction engagement device CL in accordance with the travel mode decided by the travel mode decision section 71. For example, the engagement state control section 74 brings the friction engagement device CL into the directly engaged state when the hybrid travel mode is selected, and brings the friction engagement device CL into the disengaged state when the electric travel mode is selected. The engagement state control section 74 temporarily controls the friction engagement device CL to the slip engagement state in the course of transition between the hybrid travel mode and the electric travel mode as discussed later in accordance with a command from the alignment control section 77.

1-3-6. Configuration of Synchronized Engagement Control Section

The synchronized engagement control section 75 is a functional section that executes synchronized engagement control in which the friction engagement device CL is engaged in a synchronized state (subjected to synchronized engagement) to be brought into the directly engaged state. The synchronized engagement control section 75 executes the synchronized engagement control when the internal combustion engine start condition is established with the friction engagement device CL in the disengaged state. In the following description, the synchronized engagement control section 75 executes the synchronized engagement control in the case where the internal combustion engine start condition is established during travel in the electric travel mode and the travel mode decision section 71 decides to switch the travel mode from the electric travel mode to the hybrid travel mode, for example.

The synchronized engagement control section 75 acquires a rotational speed difference $\Delta N$ between the input member I and the intermediate member M which are rotary members on both sides of the friction engagement device CL. The rotational speed difference $\Delta N$ can be acquired through calculation as the difference obtained by subtracting the rotational speed of the input member I detected by the input member sensor Se1 from the rotational speed of the second coupling member 42 (intermediate member M) detected by the second coupling member sensor Se2. In the embodiment, during travel in the electric travel mode, the internal combustion engine E is stationary, and the rotational speed of the internal combustion engine E is zero. Therefore, during travel in the electric travel mode and before the internal combustion engine E starts rotating, the synchronized engagement control section 75 can acquire as the rotational speed difference $\Delta N$ the rotational speed of the second coupling member 42 (intermediate member M) detected by the second coupling member sensor Se2 as it is.

The synchronized engagement control section 75 makes the first rotary electric machine control section 72 to vary the rotational speed of the first rotary electric machine MG1 so as to reduce the rotational speed difference $\Delta N$. Then, the synchronized engagement control section 75 determines on the basis of the acquired rotational speed difference $\Delta N$ and a synchronization determination threshold $\Delta Ns1$ (see FIG. 8) set in advance that the "synchronized state" is established in the case where the rotational speed difference $\Delta N$ is equal to or less than the synchronization determination threshold $\Delta Ns1$. The synchronized engagement control section 75 makes the engagement state control section 74 to control operation of the drive motor 31 and switches the friction engagement device CL from the disengaged state to the directly engaged state on condition that the input member I and the intermediate member M are in the synchronized state.

The synchronized engagement control executed in the embodiment will be described with reference to the FIG. 4. In each velocity diagram to be referenced in the following description, the vertical axis corresponds to the rotational speed of each rotary element. That is, the indication "0" provided on the vertical axis indicates that the rotational speed is zero, with the upper side corresponding to positive rotation (the rotational speed is positive) and the lower side corresponding to negative rotation (the rotational speed is negative). A plurality of vertical lines disposed in parallel correspond to the respective rotary elements of the differential gear device DG. In the velocity diagram, the rotational speed of the first rotary electric machine MG1, the rotational speed of the second rotary electric machine MG2, the rotational speed of the internal combustion engine E (input member I), and the rotational speed of the output shaft O are indicated by symbols that are different from each other. In order to facilitate understanding of the present invention, the respective rotational speeds of the second rotary electric machine MG2 and the output member O indicate a rotational speed transferred to the third rotary element E3.

"T1" indicates torque of the first rotary electric machine MG1 transferred to the first rotary element E1 (sun gear s). "T2" indicates torque of the second rotary electric machine MG2 transferred to the third rotary element E3 (ring gear r). "Te" indicates torque of the internal combustion engine E transferred to the second rotary element E2 (carrier ca) via the friction engagement device CL in the directly engaged state. "To" indicates travel torque (travel resistance) transferred from the output member O (wheels W) to the third rotary element E3. Of the arrows placed adjacent to each torque, an arrow pointing upward represents torque in the positive direction, and an arrow pointing downward represents torque in the negative direction.

In FIG. 4, the state of operation of the differential gear device DG in the electric travel mode is indicated by the double dashed line. In the electric travel mode, the friction engagement device CL is brought into the disengaged state, and the internal combustion engine E is disconnected from the second rotary element E2 of the differential gear device DG. This makes the second rotary element E2 freely rotatable. In addition, the rotational speed of the first rotary electric machine MG1 is brought to zero, and the second rotary element E2 is rotating at a rotational speed determined on the basis of the rotational speed of the third rotary element E3, which is determined in accordance with the vehicle speed, and the rotational speed of the first rotary element E1, which is determined in accordance with the rotational speed of the first rotary electric machine MG1 (here, zero).

From this state, the synchronized engagement control section 75 reduces the rotational speed of the first rotary electric machine MG1 from zero by causing the first rotary electric machine MG1 to output torque in the negative direction so as to reduce the rotational speed difference $\Delta N$, that is, so as to reduce the rotational speed of the second rotary element E2 coupled to the intermediate member M to rotate together with the intermediate member M. When the rotational speed of the first rotary element E1 is reduced along with a reduction in rotational speed of the first rotary electric machine MG1, the rotational speed of the second rotary element E2 is gradually reduced using the third rotary element E3 as a fulcrum with the rotational speed of the third rotary element E3, which is determined in accordance with the vehicle speed, maintained at a generally constant level.

When the respective rotational speeds of the second rotary element E2 and the intermediate member M (which is equal to the rotational speed difference $\Delta N$ in the example) becomes equal to or less than the synchronization determination threshold $\Delta Ns1$ in the course of time, the synchronized engagement control section 75 determines that the synchronized state is established. The synchronization determination threshold $\Delta Ns1$ may be set to a value of 0 to 50 [rpm], for example, and is set to 0 [rpm] in the example. That is, in the example, the synchronized engagement control section 75 determines that the synchronized state is established when the respective rotational speeds of the second rotary element E2 and the intermediate member M are reduced to become zero in the course of time, and brings the friction engagement device CL into the directly engaged state via the engagement state control section 74. In FIG. 4, the state of operation of the differential gear device DG in the synchronized state is indicated by the solid line.

1-3-7. Configuration of Start Control Section

The start control section 76 is a functional section that executes internal combustion engine start control in which the internal combustion engine E is started by raising the rotational speed of the input member I using torque of the first rotary electric machine MG1. The start control section 76 executes the internal combustion engine start control with the friction engagement device CL in the directly engaged state. That is, the start control section 76 executes the internal combustion engine start control after the synchronized engagement control section 75 executes the synchronized engagement control to bring the friction engagement device CL into the directly engaged state and while the friction engagement device CL is maintained in the directly engaged state.

In the internal combustion engine start control performed by the start control section 76, the rotational speed of the first rotary electric machine MG1 is varied to bring the internal combustion engine E to a rotational speed at which the internal combustion engine E can be started. In this event, the start control section 76 makes the first rotary electric machine control section 72 to vary the rotational speed of the first rotary electric machine MG1 in the opposite direction to the direction in which the rotational speed of the first rotary electric machine MG1 is varied in the synchronized engagement control. In the embodiment, in contrast to the synchronized engagement control in which the first rotary electric machine MG1 is output torque in the negative direction such that the rotational speed of the first rotary electric machine MG1 is reduced (see FIG. 4), the start control section 76 causes the first rotary electric machine MG1 to output torque in the positive direction to raise the rotational speed of the first rotary electric machine MG1 (see FIG. 5) in the internal combustion engine start control.

Figure 5:
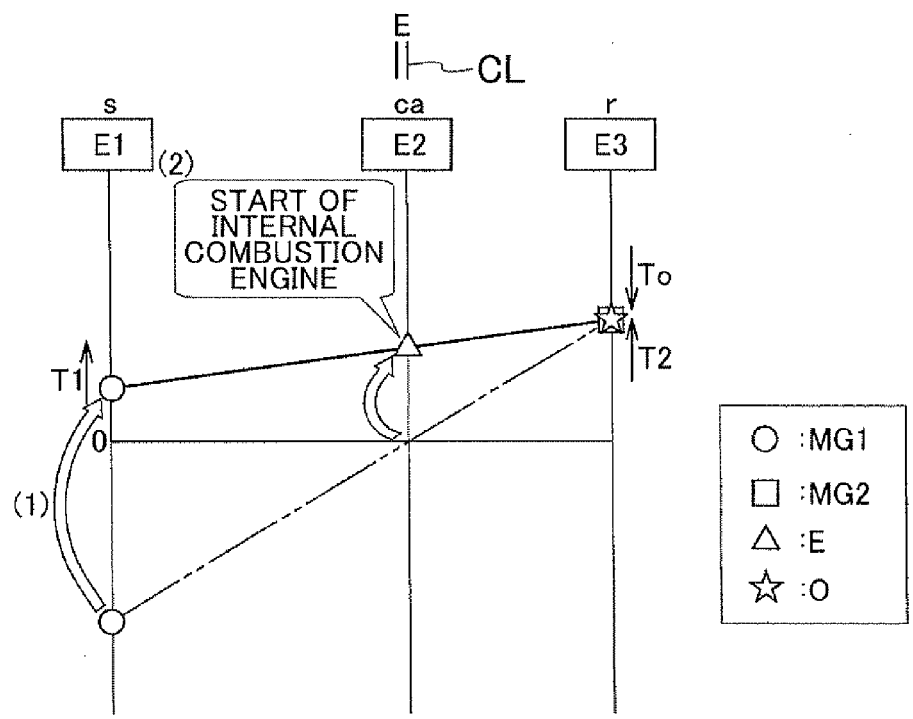
FIG. 5 is a velocity diagram illustrating internal combustion engine start control.

In FIG. 5, the state of operation of the differential gear device DG in the synchronized state is indicated by the double dashed line. When the rotational speed of the first rotary electric machine MG1 is raised through the internal combustion engine start control from this state, the rotational speed of the first rotary element E1 is also raised along with the raise in rotational speed of the first rotary electric machine MG1. Then, with the rotational speed of the third rotary element E3, which is determined in accordance with the vehicle speed, maintained at a generally constant level, the rotational speed of the second rotary element E2 is gradually raised using the third rotary element E3 as a fulcrum. In the internal combustion engine start control, the friction engagement device CL is maintained in the directly engaged state, and thus torque of the first rotary electric machine MG1 in the positive direction is transferred to the input member I and the internal combustion engine E via the intermediate member M and the friction engagement device CL to raise the rotational speed of the internal combustion engine E.

In the embodiment, the rotational speed control for the first rotary electric machine MG1 is executed in the internal combustion engine start control. That is, in the internal combustion engine start control, the first rotary electric machine control section 72 issues a command for target rotational speed for the first rotary electric machine MG1 to make the rotational speed of the first rotary electric machine MG1 coincide with the target rotational speed. In this case, the target rotational speed for the first rotary electric machine MG1 is set to a rotational speed of the first rotary electric machine MG1 corresponding to a rotational speed of the internal combustion engine E at which the internal combustion engine E can be started (ignition rotational speed Nf; see FIG. 8). In the internal combustion engine start control, initially, load torque due to a moment of inertia is applied to the internal combustion engine E which is stationary, and thus the first rotary electric machine MG1 outputs large torque in the positive direction. Thereafter, such load torque is decreased in the course of time along with a raise in rotational speed of the internal combustion engine E, and torque of the first rotary electric machine MG1 for maintaining the target rotational speed is gradually reduced (see FIG. 8).

Then, when the rotational speed of the internal combustion engine E is raised from zero to become equal to or more than the ignition rotational speed Nf in the course of time, the start control section 76 determines that the internal combustion engine E can be ignited, and makes the internal combustion engine control unit 3 to start the internal combustion engine E. In the embodiment, the ignition rotational speed Nf is a rotational speed at which the internal combustion engine E can be ignited to be started (for example, a rotational speed during idling), and is set to a value that is larger than an alignment enabling rotational speed Nl to be discussed later (see FIG. 8) in the example.

Figure 6:
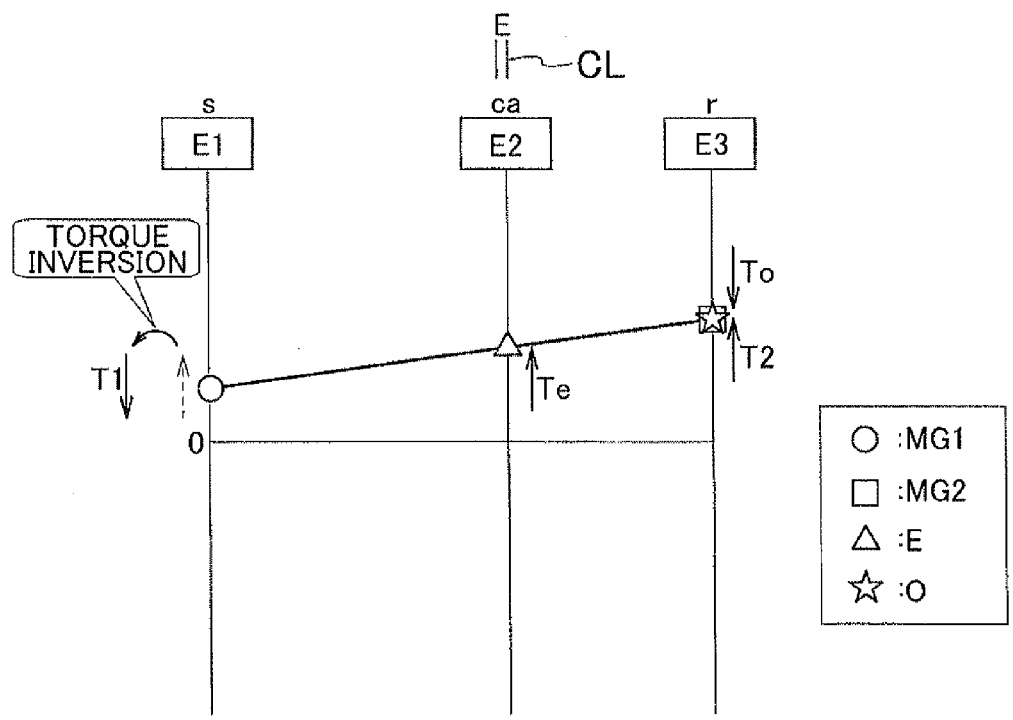
FIG. 6 is a velocity diagram illustrating a state of operation of various components at the time of start of an internal combustion engine.

As shown in FIG. 6, when the internal combustion engine E is started to start self-sustained operation through the internal combustion engine start control, the internal combustion engine E starts outputting torque in the positive direction. Then, torque of the internal combustion engine E in the positive direction is transferred to the first rotary electric machine MG1 via the friction engagement device CL and the differential gear device DG, which urges the rotational speed of the first rotary electric machine MG1 to be raised. As described above, however, the rotational speed control for the first rotary electric machine MG1 is executed in the internal combustion engine start control, and in the embodiment, the rotational speed control is continuously executed further after the internal combustion engine E is started. Therefore, the first rotary electric machine control section 72 controls the first rotary electric machine MG1 so as to output torque in the opposite direction to that at the time of start of the internal combustion engine E such that the rotational speed of the first rotary electric machine MG1 coincides with the target rotational speed.

That is, in the embodiment, in contrast to causing the first rotary electric machine MG1 to output torque in the positive direction to raise the rotational speed of the first rotary electric machine MG1 before the internal combustion engine E is started, the first rotary electric machine control section 72 causes the first rotary electric machine MG1 to output torque in the negative direction to make the rotational speed of the first rotary electric machine MG1 coincide with the target rotational speed after the internal combustion engine E is started. Thus, in the embodiment, the direction of torque of the first rotary electric machine MG1 is inverted from the positive direction to the negative direction when the internal combustion engine E is started to start self-sustained operation. This allows smooth transition into the hybrid travel mode along with execution of the internal combustion engine start control and the rotational speed control for the first rotary electric machine MG1, which are executed concurrently.

In the embodiment, mode switching from the electric travel mode to the hybrid travel mode is performed the synchronized engagement control section 75 after the state, that internal combustion engine E is in the stationary state and the input member I and the intermediate member M are in the synchronized state, and thus there is a phase in which both the respective rotational speeds of the input member I and the intermediate member M become zero. Therefore, the input member I and the intermediate member M may become eccentric with respect to each other. That is, in the embodiment, the intermediate member M is formed by the second coupling member 42 and the damper device DA, which are drivably coupled to each other to rotate together with each other via the spline coupling portion 29 as shown in FIG. 2. In the spline coupling portion 29, a predetermined clearance is provided between the inner peripheral surface of the cylindrical portion 28 of the damper device DA and the outer peripheral surface of the second coupling member 42. Therefore, when the rotational speed of the intermediate member M is zero, at least the axis adjustment function due to rotation of the damper device DA itself is not activated, and the damper device DA moves vertically downward because of its own weight to make the clearance described above non-equal. That is, the clearance at a height vertically below the second coupling member 42 is larger than the clearance at a height vertically above the second coupling member 42.

In the embodiment, meanwhile, the axis of the input member I is maintained at a favorable accuracy at all times via an input bearing (not shown), and the axis of the second coupling member 42 forming the intermediate member M is likewise maintained at a favorable accuracy at all times via an intermediate bearing (not shown). Therefore, the input member I and the intermediate member M are eccentric with respect to each other as a whole in a state in which the rotational speed of the intermediate member M is zero and only the damper device DA is moved vertically downward. When the friction engagement device CL is brought into the directly engaged state from this state, the respective radial positions of the input member I and the intermediate member M are restrained by the friction engagement device CL with the input member I and the intermediate member M remaining eccentric with respect to each other. Then, if the vehicle were continuously run with the eccentric state maintained, the input member I and the intermediate member M which are eccentric with respect to each other whirl to vibrate as a whole, which may increase the load acting on the input bearing which supports the input member I and the intermediate bearing which supports the second coupling member 42. Thus, in order to suppress maintenance of such an eccentric state, the control device 70 according to the embodiment includes the alignment control section 77.

1-3-8. Configuration of Alignment Control Section

The alignment control section 77 is a functional section that performs alignment operation (alignment control), in which the friction engagement device CL is temporarily brought into the slip engagement state, in an internal combustion engine rotating state, in which the internal combustion engine E is rotating at a rotational speed that is equal to or more than a predetermined rotational speed. Here, in the embodiment, the term "alignment operation" refers to operation in which the engagement pressure of the friction engagement device CL is reduced and in which the friction engagement device CL is returned to the directly engaged state upon detecting that the rotational speed difference ΔN between the input member I and the intermediate member M reaches a slip determination threshold ΔNs2. In addition, the term "internal combustion engine rotating state" refers to a state in which the rotational speed of the internal combustion engine E is equal to or more than the alignment enabling rotational speed NI, which is set to a value that is smaller than the ignition rotational speed Nf in the embodiment. That is, the alignment control section 77 performs the alignment operation with the rotational speed of the internal combustion engine E being at least equal to or more than the alignment enabling rotational speed NI. The alignment enabling rotational speed NI is set in advance to a rotational speed that is equal to or more than the rotational speed at which the internal combustion engine E and the input member I can exert their axis adjustment function (for example, 200 [rpm]). In the example, the alignment enabling rotational speed NI is set to a value that is slightly smaller than the ignition rotational speed Nf (see FIG. 8).

In the embodiment, further, the alignment control section 77 performs the alignment operation after torque of the internal combustion engine E becomes equal to or more than a predetermined start determination torque TI. The start determination torque TI is set in advance as torque at which the internal combustion engine E starts self-sustained operation to start outputting torque. When torque of the internal combustion engine E is equal to or more than the start determination torque TI, the rotational speed of the internal combustion engine E is equal to or more than the ignition rotational speed Nf, and is more than the alignment enabling rotational speed NI. Hence, the alignment operation can be reliably performed in the internal combustion engine rotating state by adopting a configuration in which the alignment operation is performed with torque of the internal combustion engine E being equal to or more than the start determination torque TI. In addition, the alignment operation can be advantageously performed with the axis adjustment function activated utilizing rotation and torque of the internal combustion engine E which has started self-sustained operation.

In addition, in the embodiment, as discussed above, the rotational speed control for the first rotary electric machine MG1 is executed during execution of the internal combustion engine start control, as a result of which the direction of torque of the first rotary electric machine MG1 is inverted between before and after the internal combustion engine E is started to start self-sustained operation. In view of this point, in the embodiment, further, the alignment control section 77 detects torque inversion, in which the direction of torque of the first rotary electric machine MG1 is inverted, during execution of the rotational speed control for the first rotary electric machine MG1 to perform the alignment operation after the torque inversion is detected. Thus, it is possible to easily and appropriately determine the time point when torque of the internal combustion engine E becomes equal to or more than the start determination torque TI by detecting an event in which the direction of torque of the first rotary electric machine MG1 is inverted. The alignment control section 77 can detect torque inversion by monitoring a command value for target torque for the first rotary electric machine MG1 output from the first rotary electric machine control section 72.

In the embodiment, the alignment control section 77 starts the alignment operation upon detection of torque inversion in which the direction of torque of the first rotary electric machine MG1 is inverted. That is, at the same time as torque inversion is detected, the alignment control section 77 makes the engagement state control section 74 to control operation of the drive motor 31 and reduces the engagement pressure of the friction engagement device CL (the pressure of engagement between the pressure plate 23 and the flywheel 21 holding the clutch disc 27). When the engagement pressure of the friction engagement device CL is relatively large, the restraining force due to the engagement pressure is also large, and the restraining force is dominant over whirling torque due to the eccentricity of the input member I and the intermediate member M. Therefore, the friction engagement device CL is maintained in the directly engaged state, and the respective radial positions of the input member I and the intermediate member M are maintained as they are by the engagement pressure of the friction engagement device CL.

When the engagement pressure of the friction engagement device CL is gradually reduced and whirling torque due to the eccentricity of the input member I and the intermediate member M becomes dominant over the restraining force, slip occurs between the flywheel 21 and the pressure plate 23 and the clutch disc 27. That is, the friction engagement device CL is brought into the slip engagement state. At the time point when such slip occurs, the internal combustion engine rotating state has already been established, and further in the embodiment, the input member I and the intermediate member M are rotating at a rotational speed that is sufficiently higher than the alignment enabling rotational speed NI. Therefore, the axis adjustment function due to rotation of the input member I and the intermediate member M can be activated while the friction engagement device CL is in the slip engagement state, that is, while the restraining force due to the engagement pressure of the friction engagement device is relaxed. Here, in particular, the axis adjustment function due to rotation of the damper device DA forming the intermediate member M can be activated. That is, alignment can be achieved by equalizing the clearance between the inner peripheral surface of the cylindrical portion 28 of the damper device DA and the outer peripheral surface of the second coupling member 42 over the entire circumference. This makes it possible to suppress continuation of an eccentric state of the input member I and the intermediate member M which are rotary members on both sides of the friction engagement device CL.

In the embodiment, the alignment control section 77 determines completion of axis adjustment on the basis of the rotational speed difference ΔN between the input member I and the intermediate member M on both sides of the friction engagement device CL. The alignment control section 77 determines completion of the axis adjustment by referencing a completion determination condition defined on the basis of the rotational speed difference ΔN and the slip determination threshold ΔNs2 (see FIG. 8) serving as the rotation difference threshold set in advance. Specifically, the completion determination condition is set to be established when "the rotational speed difference ΔN, which is calculated as the difference obtained by subtracting the rotational speed of the input member I detected by the input member sensor Se1 from the rotational speed of the second coupling member 42 (intermediate member M) detected by the second coupling member sensor Set, reaches the slip determination threshold ΔNs2". The slip determination threshold ΔNs2 may be set to a value of 30 to 100 [rpm], for example. Such a completion determination condition makes it possible to directly determine that the axis adjustment function is activated with slip actually occurring between the input member I and the intermediate member M.

After determining that the axis adjustment is completed, the alignment control section 77 returns the friction engagement device CL to the directly engaged state. That is, at the same time as determination of completion of the axis adjustment, the alignment control section 77 makes the engagement state control section 74 to control operation of the drive motor 31 and raises the engagement pressure of the friction engagement device CL again to bring the friction engagement device into the directly engaged state. This allows the friction engagement device CL to restrain the respective radial positions of the input member I and the intermediate member M (the input member I, the damper device DA, and the second coupling member 42), which have been favorably aligned with each other with the restraining force due to the engagement pressure of the friction engagement device CL relaxed, with the input member I and the intermediate member M remaining in the favorably aligned state.

That is, in the alignment operation according to the embodiment, the engagement pressure of the friction engagement device CL is reduced to temporarily reduce the restraining force due to the engagement pressure after it is confirmed that the internal combustion engine rotating state, in which the rotational speed of the internal combustion engine E is equal to or more than the alignment enabling rotational speed NI, is established, and the friction engagement device CL is returned to the directly engaged state again after detecting that the predetermined rotational speed difference ΔN is caused between the input member I and the intermediate member M. This makes it possible to temporarily relax the restraining force for the respective radial positions of the input member I and the intermediate member M, and to activate the axis adjustment function due to rotation of the input member I and the intermediate member M during that period to suppress continuation of an eccentric state of such members. After the input member I and the intermediate member M are brought into a favorably aligned state, the restraining force for the respective radial positions of such members is strengthened again to continue the favorably aligned state.

Figure 7:
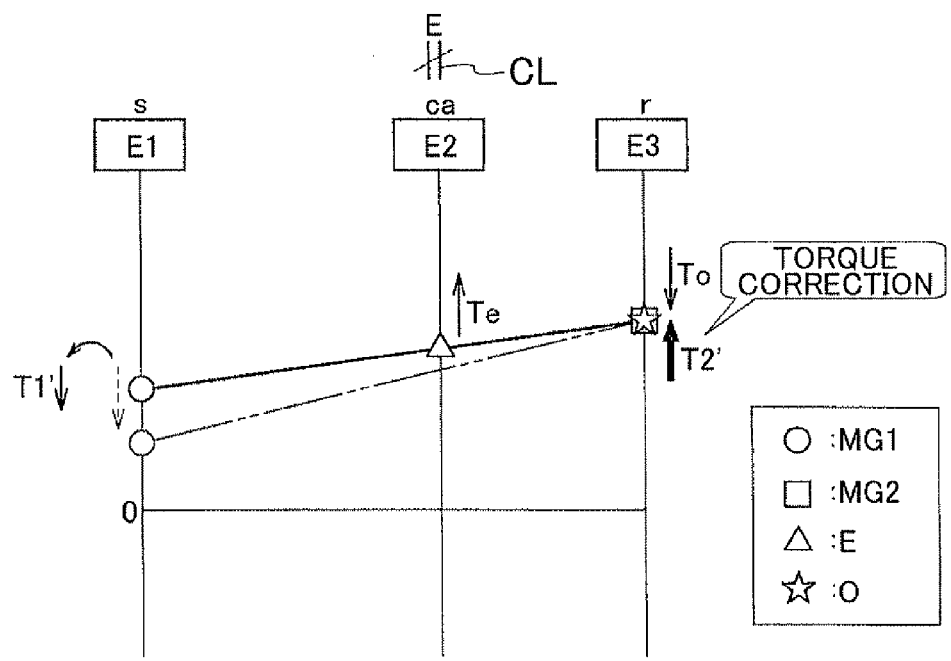
FIG. 7 is a velocity diagram illustrating operation for alignment control.

When the engagement pressure of the friction engagement device CL is reduced during the alignment operation and the friction engagement device CL is actually brought into the slip engagement state to reduce torque transferred from the internal combustion engine E side via the friction engagement device CL, the rotational speed of the first rotary electric machine MG1 is reduced by torque of the first rotary electric machine MG1 in the negative direction. That is, the state of operation of the differential gear device DG is as indicated by the double dashed line in FIG. 7. In the embodiment, in this respect, the alignment control section 77 starts the alignment operation at the same time as torque inversion in which the direction of torque of the first rotary electric machine MG1 is inverted is detected. Torque of the first rotary electric machine MG1 becomes zero at the moment when torque of the first rotary electric machine MG1 is inverted. In addition, the absolute value of torque of the first rotary electric machine MG1 remains a relatively small value that is close to zero during a predetermined period including torque inversion, during which the alignment operation is performed.

Therefore, even if torque transferred from the internal combustion engine E side via the friction engagement device CL is reduced during the alignment operation as described above, the rotational speed of the first rotary electric machine MG1 is reduced by torque of the first rotary electric machine MG1 in the negative direction only to a relatively small degree. Hence, it is possible to suppress occurrence of fluctuations in respective rotational speeds of the first rotary electric machine MG1 and the intermediate member M drivably coupled to the first rotary electric machine MG1 via the differential gear device DG. It is also possible to suppress occurrence of fluctuations in rotational speed of the internal combustion engine E when the engagement pressure of the friction engagement device CL is raised again to return the friction engagement device CL to the directly engaged state after the alignment.

Meanwhile, the first rotary electric machine control section 72 continuously executes the rotational speed control for the first rotary electric machine MG1 during the alignment operation. Therefore, when the rotational speed of the first rotary electric machine MG1 is reduced with the friction engagement device CL in the slip engagement state as described above along with the alignment operation, the first rotary electric machine control section 72 controls torque of the first rotary electric machine MG1 so as to raise the rotational speed of the first rotary electric machine MG1. That is, the first rotary electric machine control section 72 reduces the absolute value of torque of the first rotary electric machine MG1 by outputting a command to reduce the absolute value of negative torque in the negative direction output from the first rotary electric machine MG1. This raises the rotational speed of the first rotary electric machine MG1 so as to coincide with the target rotational speed. In this way, the state of operation of the differential gear device DG is returned to the state indicated by the solid line in FIG. 7 with the friction engagement device CL temporarily brought into the slip engagement state.

In this event, both torque of the first rotary electric machine MG1 transferred to the first rotary element E1 of the differential gear device DG (labeled as "T1" in FIG. 7) and torque of the internal combustion engine E transferred to the second rotary element E2 via the friction engagement device CL in the slip engagement state are reduced compared to those before start of the alignment operation, as a result of which torque transferred to the output member O via the third rotary element E3 is decreased. Thus, in the embodiment, during the alignment operation, the second rotary electric machine control section 73 controls the second rotary electric machine MG2 so as to correct variations in torque transferred to the output member O along with the rotational speed control for the first rotary electric machine MG1. That is, the second rotary electric machine control section 73 increases torque of the second rotary electric machine MG2, by supplementing torque transferred to the output member O with an amount of torque by which such torque has been decreased because of continuation of the rotational speed control for the first rotary electric machine MG1, to cancel the decrease. This makes it possible to suppress variations in torque transferred to the output member O, and to suppress an uncomfortable feeling to be given to a passenger of the vehicle. This also makes it possible to appropriately maintain a state in which torque corresponding to the required drive force is transferred to the output member O.

Figure 9:
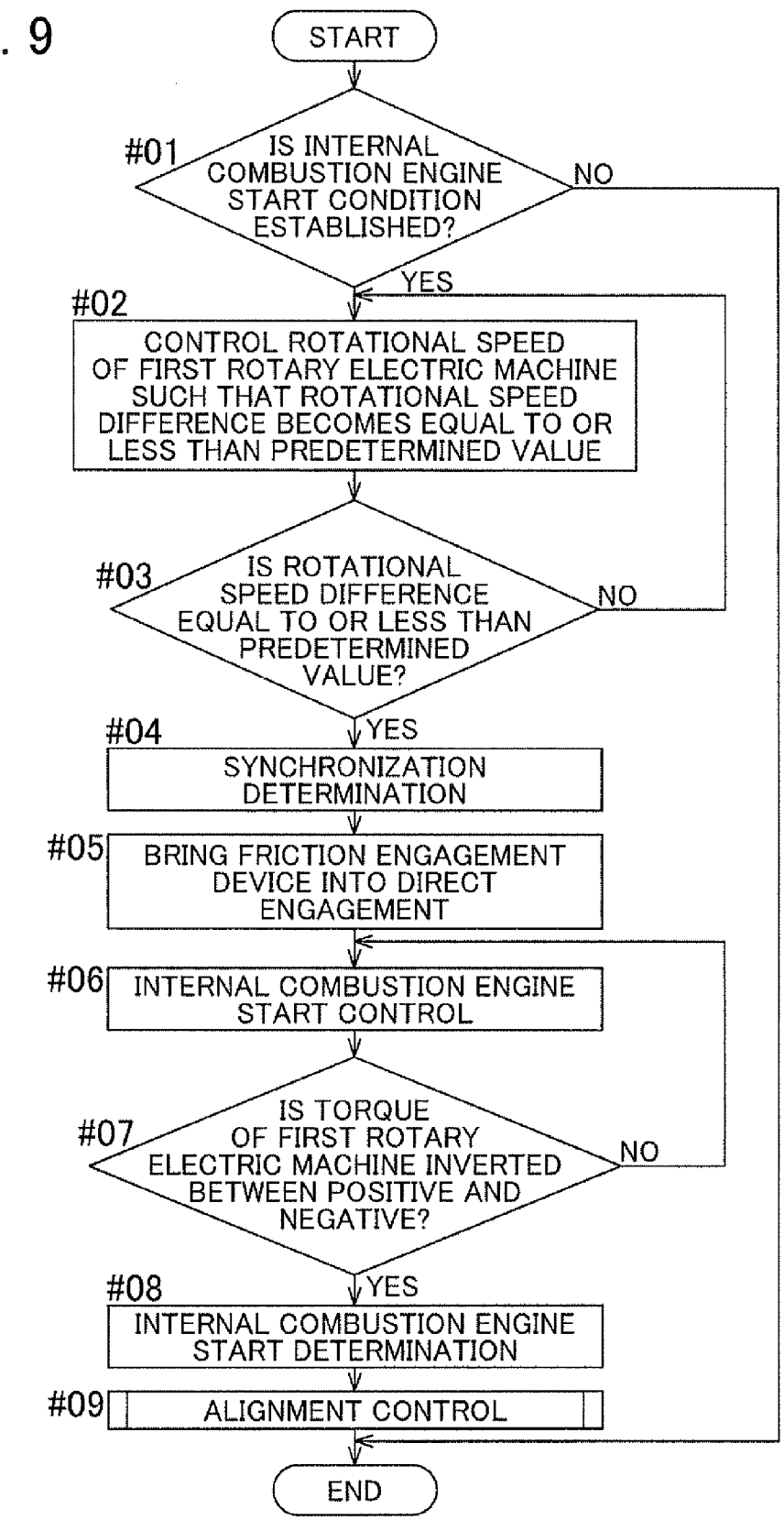
FIG. 9 is a flowchart showing the overall process procedures of the mode switch control including the alignment control.
Figure 10:
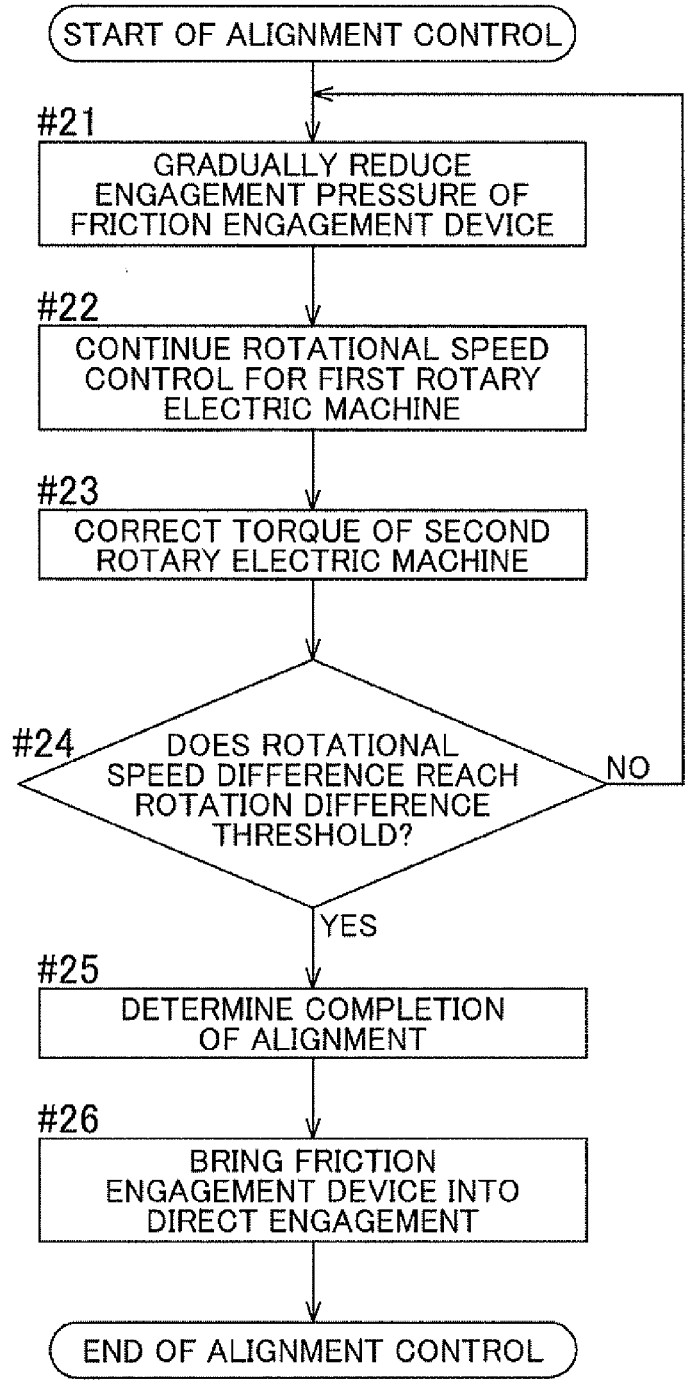
FIG. 10 is a flowchart showing the process procedures of the alignment control.

1-4. Specific Content and Process Procedures of Mode Switch Control Including Alignment Control Next, the specific content and the process procedures of the mode switch control including the alignment control according to the embodiment will be described with reference to the time chart of FIG. 8 and the flowcharts of FIGS. 9 and 10. As has been described so far as a specific example, FIG. 8 assumes a case where the internal combustion engine start condition is established during travel in the electric travel mode to switch into the hybrid travel mode. FIG. 9 is a flowchart showing the overall process procedures of the mode switch control. FIG. 10 is a flowchart showing the process procedures of the alignment control in step #09.

Figure 8:
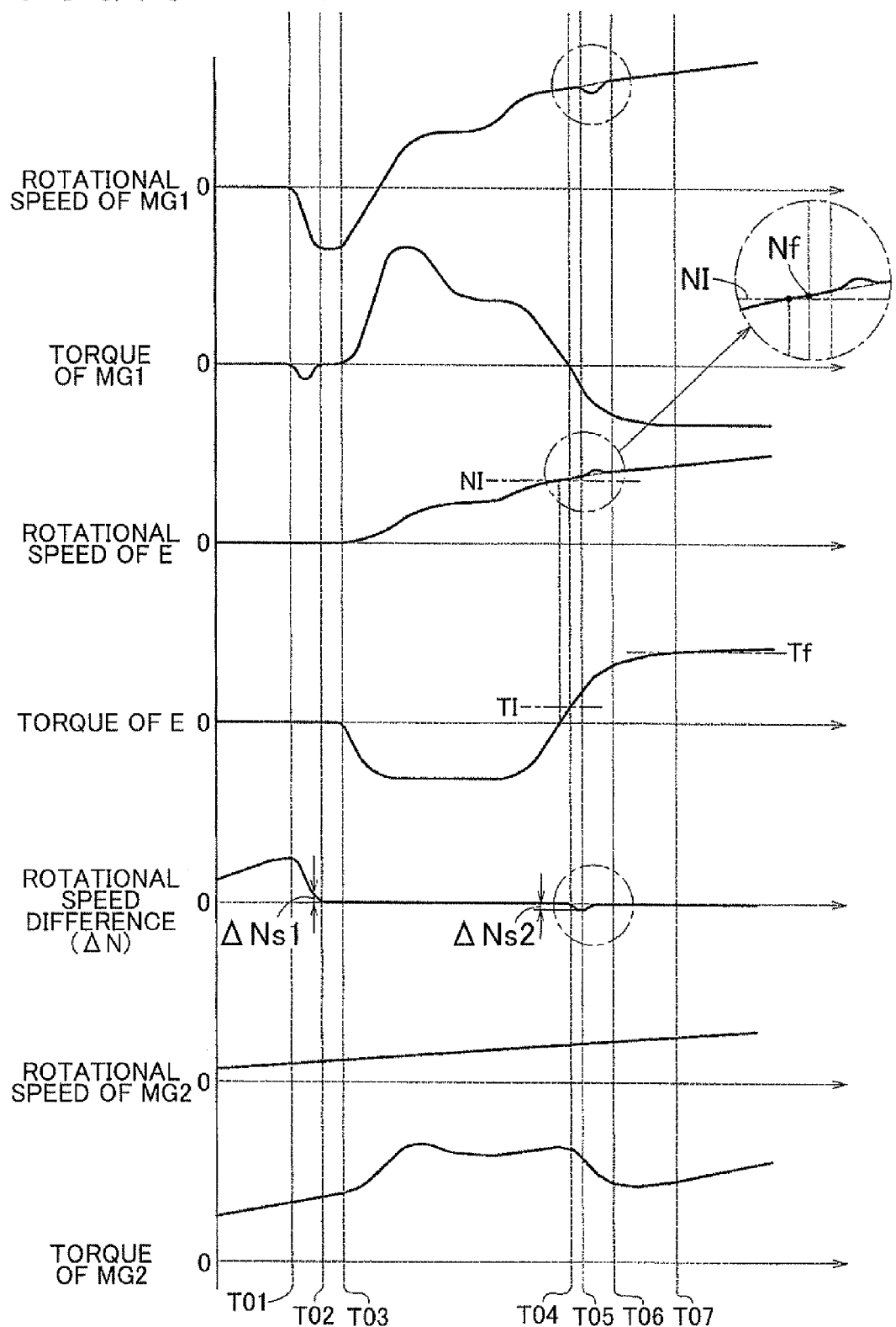
FIG. 8 is a time chart showing an example of a state of operation of various components during execution of mode switch control including the alignment control.

As shown in FIG. 8, the vehicle is first run in the electric travel mode with both the internal combustion engine E and the first rotary electric machine MG stationary and with torque of the second rotary electric machine MG2 transferred to the output member O. In this state, the travel mode decision section 71 determines whether or not the internal combustion engine start condition is established (step #01 of FIG. 9). If the internal combustion engine start condition is established at time T01 (step #01: Yes), the synchronized engagement control is executed over a period from time T01 to time T02. In the synchronized engagement control, the synchronized engagement control section 75 makes the first rotary electric machine control section 72 to vary the rotational speed of the first rotary electric machine MG1 so as to reduce the rotational speed difference ΔN between the input member I and the intermediate member M to be equal to or less than the predetermined synchronization determination threshold ΔNs1 (in the example, zero) (step #02). The rotational speed control for the first rotary electric machine MG1 is continuously executed until the rotational speed difference ΔN becomes equal to or less than the synchronization determination threshold ΔNs1 (step #03: No). Thereafter, when the rotational speed difference ΔN reaches the synchronization determination threshold ΔNs1 at time T02 (step #03: Yes), it is determined that the synchronized state is established (step #04), and the synchronized engagement control section 75 brings the friction engagement device CL into the directly engaged state via the engagement state control section 74 (step #05).

After a predetermined time elapses after the friction engagement device CL is brought into the directly engaged state, the start control section 76 starts the internal combustion engine start control at time T03 (step #06). In the internal combustion engine start control, the rotational speed of the first rotary electric machine MG1 is raised to a rotational speed at which the internal combustion engine E can be started over a period from time T03 to time T04. In this event, the first rotary electric machine MG1 is subjected to rotational speed control to gradually raise the rotational speed of the internal combustion engine E while outputting torque against load torque of the internal combustion engine E. The second rotary electric machine control section 73 controls torque of the second rotary electric machine MG2 so as to correct and cancel variations in torque transferred to the output member O via the differential gear device DG under the influence of torque output from the first rotary electric machine MG1 and load torque of the internal combustion engine E. During the internal combustion engine start control, the alignment control section 77 monitors variations in direction of torque of the first rotary electric machine MG1. Specifically, the alignment control section 77 monitors whether or not the sign of the command value for target torque for the first rotary electric machine MG1 is inverted from positive to negative (step #07). If inversion in direction of torque of the first rotary electric machine MG1 is detected at time T04 (step #07: Yes), it is determined that the internal combustion engine E is started (step #08). In the embodiment, when it is determined that the internal combustion engine E is started, it is determined that the internal combustion engine rotating state is established. When start of the internal combustion engine E is determined, the alignment control is executed next (step #09).

In the alignment control, the alignment control section 77 makes the engagement state control section 74 to control operation of the drive motor 31 from time T04 to gradually reduce the engagement pressure of the friction engagement device CL (step #21). Meanwhile, the first rotary electric machine control section 72 continuously executes the rotational speed control for the first rotary electric machine MG1 also during the alignment operation (step #22). Torque transferred to the output member O is varied when the friction engagement device CL is brought into the slip engagement state along with the rotational speed control for the first rotary electric machine MG1. Thus, the second rotary electric machine control section 73 controls the second rotary electric machine MG2 so as to correct variations in torque transferred to the output member O along with the rotational speed control for the first rotary electric machine MG1 (step #23).

The above processes in the alignment control are repeatedly executed until the rotational speed difference ΔN between the input member I and the intermediate member M reaches the predetermined slip determination threshold ΔNs2 (step #24: No). Thereafter, when the rotational speed difference ΔN reaches the slip determination threshold ΔNs2 at time T05 (step #24: Yes), it is determined that the axis adjustment is completed (step #25). After completion of the axis adjustment is determined, the alignment control section 77 makes the engagement state control section 74 to control operation of the drive motor 31 from time T05 and gradually raises the engagement pressure of the friction engagement device CL to bring the friction engagement device CL into the directly engaged state (step #26). In the alignment control, the rotational speed of the first rotary electric machine MG1 is temporarily reduced when the friction engagement device CL is temporarily brought into the slip engagement state. However, the rotational speed of the first rotary electric machine MG1 is raised again through the rotational speed control. When the rotational speed of the first rotary electric machine MG1 coincides with the target rotational speed at time T06, the alignment control is terminated. Thereafter, when torque of the internal combustion engine E reaches ignition determination toque Tf for stable self-sustained operation at time T07, the internal combustion engine start control is terminated, along with which the mode switch control is also terminated. The above processes are executed each time the vehicle is run in the electric travel mode.

2. Second Embodiment

A vehicle drive device according to a second embodiment of the present invention will be described with reference to the drawings. The vehicle drive device 1 according to the embodiment is different from the first embodiment described above mainly in the method to determine completion of the axis adjustment performed by the alignment control section 77 and the associated configuration. The differences between the configuration of the vehicle drive device 1 according to the embodiment and that according to the first embodiment described above will be mainly described below. The same elements as those in the first embodiment described above will not be specifically described.

The alignment control section 77 determines completion of the axis adjustment at least on the basis of the rotational speed difference ΔN between the input member I and the intermediate member M as in the first embodiment described above. In the embodiment, further, the alignment control section 77 determines completion of the axis adjustment also on the basis of the rotational speed of the first rotary electric machine MG1. That is, the alignment control section 77 determines completion of the axis adjustment in the case where at least one of a first determination condition based on the rotational speed difference ΔN and a second determination condition based on the rotational speed of the first rotary electric machine MG1 is established. Here, the first determination condition is the same as the completion determination condition described in relation to the first embodiment described above, and specifically set to be established when "the rotational speed difference ΔN, which is calculated as the difference obtained by subtracting the rotational speed of the input member I detected by the input member sensor Se1 from the rotational speed of the second coupling member 42 (intermediate member M) detected by the second coupling member sensor Se2, reaches the slip determination threshold ΔNs2".

In the embodiment, as a presumption for the alignment control section 77 to reference the second determination condition, the alignment control section 77 is configured to perform the alignment operation with both torque of the first rotary electric machine MG1 and torque of the internal combustion engine E maintained at respective constant values. Therefore, the control device 70 according to the embodiment further includes a torque maintenance control section 78 (indicated by the broken line in FIG. 3). The torque maintenance control section 78 outputs a torque maintenance command to command the first rotary electric machine control section 72 to maintain torque of the first rotary electric machine MG1 at a constant value that is not varied over time, and to command the internal combustion engine control unit 3 to maintain torque of the internal combustion engine E at a constant value that is not varied over time. While the torque maintenance command is output, command values for target torque for the first rotary electric machine MG1 and the internal combustion engine E are fixed at respective values at the start of the alignment operation.

When the engagement pressure of the friction engagement device CL is reduced with both torque of the first rotary electric machine MG1 and torque of the internal combustion engine E maintained at respective constant values and the friction engagement device CL is actually brought into the slip engagement state to reduce torque transferred from the internal combustion engine E side via the friction engagement device CL, and in the case where the first rotary electric machine MG1 is outputting torque in the negative direction, the rotational speed of the first rotary electric machine MG1 is reduced by torque of the first rotary electric machine MG1. Hence, detecting an event in which the rotational speed of the first rotary electric machine MG1 is varied (here, reduced) makes it easy to indirectly determine that the axis adjustment function is activated with slip occurring between the input member I and the intermediate member M. From such a viewpoint, in the embodiment, the second determination condition is specifically set to be established when "the amount of variation in rotational speed of the first rotary electric machine MG1 is equal to or more than a rotation variation determination threshold set in advance". The rotation variation determination threshold may be set in advance, or may be set in accordance with the vehicle speed, the rotational speed of the internal combustion engine E, the magnitude of torque of the first rotary electric machine MG1, or the like.

In this case, the alignment control section 77 may be configured to start the alignment operation after torque of the first rotary electric machine MG1 becomes equal to or less than a predetermined negative torque threshold set as a negative value after the direction of torque of the first rotary electric machine MG1 is inverted when the internal combustion engine E is started, with torque of the first rotary electric machine MG1 maintained at a constant value, for example. Alternatively, the alignment control section 77 may be configured to start the alignment operation after a predetermined time elapses after the direction of torque of the first rotary electric machine MG1 is inverted when the internal combustion engine E is started, and with torque of the first rotary electric machine MG1 at that time point maintained at a constant value, for example.

Figure 11:
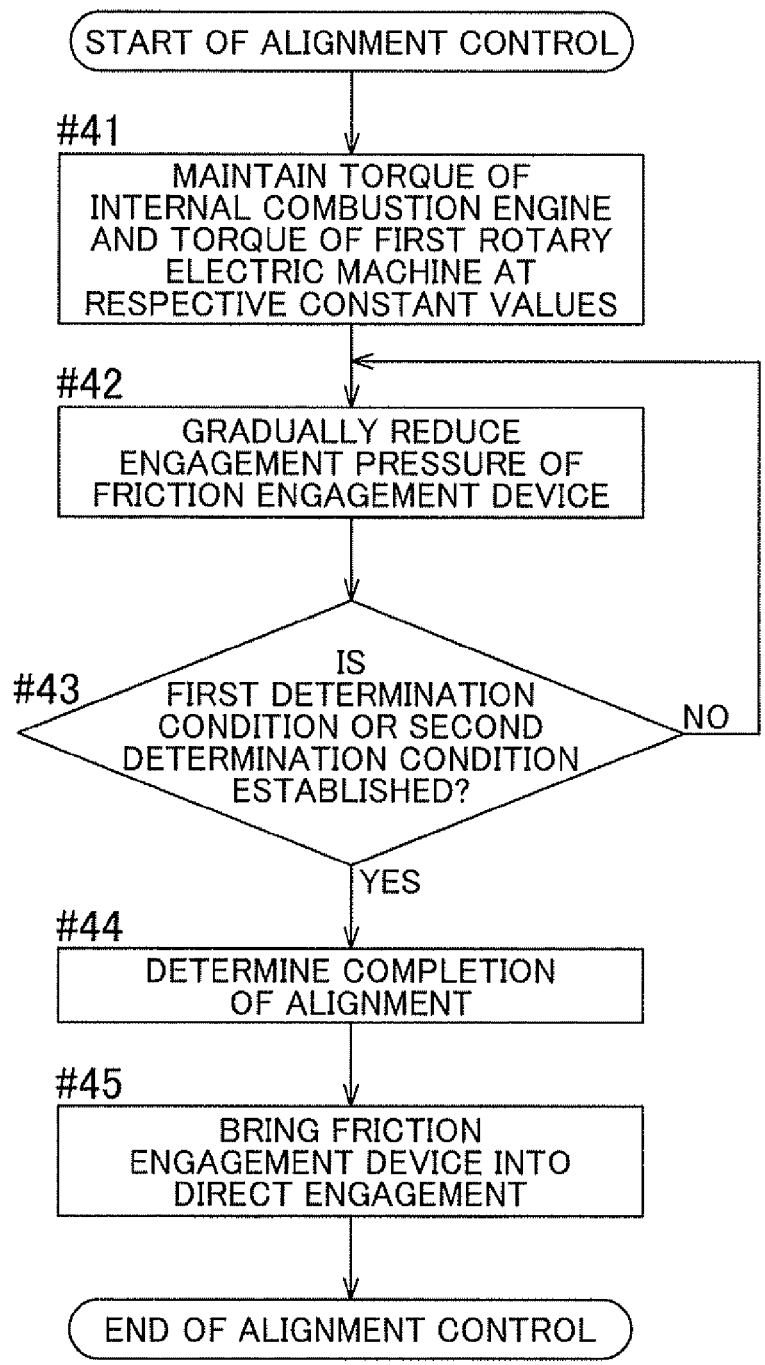
FIG. 11 is a flowchart showing the process procedures of alignment control according to a second embodiment of the present invention.

FIG. 11 is a flowchart showing the process procedures of the alignment control according to the embodiment. In the alignment control, as shown in FIG. 11, the alignment control section 77 makes the torque maintenance control section 78 to maintain torque of the internal combustion engine E and torque of the first rotary electric machine MG1 at respective constant values (step #41). Thereafter, the alignment control section 77 makes the engagement state control section 74 to control operation of the drive motor 31 to gradually reduce the engagement pressure of the friction engagement device CL (step #42). Thereafter, when one of the first determination condition and the second determination condition described above is established (step #43: Yes), it is determined that the axis adjustment is completed (step #44). After completion of the axis adjustment is determined, the alignment control section 77 makes the engagement state control section 74 to control operation of the drive motor 31 and gradually raises the engagement pressure of the friction engagement device CL to bring the friction engagement device CL into the directly engaged state (step #45). The alignment control is thus terminated.

3. Other Embodiments

Lastly, vehicle drive devices according to other embodiments of the present invention will be described. A configuration disclosed in each of the following embodiments may be applied in combination with a configuration disclosed in any other embodiment unless any contradiction occurs.

(1) In each of the embodiments described above, the alignment enabling rotational speed NI is set to a value that is slightly smaller than the ignition rotational speed Nf. However, the present invention is not limited thereto. That is, it is only necessary that the alignment enabling rotational speed NI should be set to a value that is at least equal to or more than the rotational speed at which the internal combustion engine E and the input member I can exert their axis adjustment function. In one preferred embodiment of the present invention, the alignment enabling rotational speed NI may be set to a value that is sufficiently smaller than the ignition rotational speed Nf, or may be set to a value that is equal to or more than the ignition rotational speed Nf.

In each of the embodiments described above, in addition, the alignment control is executed in the internal combustion engine rotating state and with the rotational speed of the internal combustion engine E being equal to or more than the ignition rotational speed Nf. However, the present invention is not limited thereto. That is, in one preferred embodiment of the present invention, the alignment control may be executed in the internal combustion engine rotating state and with the rotational speed of the internal combustion engine E being less than the ignition rotational speed Nf, for example, in the case where the alignment enabling rotational speed NI is set to a value that is smaller than the ignition rotational speed Nf. With the rotational speed of the internal combustion engine E being less than the ignition rotational speed Nf, the internal combustion engine E is not in self-sustained operation yet. With the internal combustion engine E rotating at a rotational speed that is at least equal to or more than the alignment enabling rotational speed NI, however, the axis adjustment function is activated to suppress continuation of an eccentric state of the intermediate member M and the input member I.

(2) In the first embodiment described above, the alignment control section 77 starts the alignment operation upon detection of torque inversion in which the direction of torque of the first rotary electric machine MG1 is inverted. In the second embodiment described above, meanwhile, the alignment control section 77 starts the alignment operation at the time point of detecting that torque of the first rotary electric machine MG1 becomes equal to or less than a predetermined negative torque threshold set to a negative value, or at the time point when a predetermined time elapses after detection of torque inversion. However, the present invention is not limited thereto. That is, also in the first embodiment described above, the alignment control section 77 may be configured to start the alignment operation at the time point when a predetermined time elapses after detection of torque inversion, or at the time point of detecting that torque of the first rotary electric machine MG1 becomes equal to or less than a predetermined negative torque threshold set to a negative value, for example. Such a configuration also constitutes one preferred embodiment of the present invention.

(3) In each of the embodiments described above, the alignment control section 77 may be configured to monitor the rotational speed of the second coupling member 42 (intermediate member M) detected by the second coupling member sensor Set, and to start the alignment operation at the time point of detecting that the rotational speed of the intermediate member M reaches the alignment enabling rotational speed NI, for example. Such a configuration also constitutes one preferred embodiment of the present invention. In an alternative preferred embodiment of the present invention, the alignment control section 77 may be configured to start the alignment operation after a predetermined time elapses after detecting that the rotational speed of the intermediate member M reaches the alignment enabling rotational speed NI.

(4) In each of the embodiments described above, the alignment control section 77 may be configured to monitor torque of the internal combustion engine E using a torque sensor or the like, and to start the alignment operation at the time point of detecting that torque of internal combustion engine E reaches the start determination torque TI, for example. Such a configuration also constitutes one preferred embodiment of the present invention. In an alternative preferred embodiment of the present invention, the alignment control section 77 may be configured to start the alignment operation after a predetermined time elapses after detecting that torque of the internal combustion engine E reaches the start determination torque TI.

In short, the timing for the alignment control section 77 to start the alignment operation may be set as desired as long as the rotational speed of the internal combustion engine E is at least equal to or more than the alignment enabling rotational speed NI. In order to suppress continuation of an eccentric state of the intermediate member M and the input member I, however, it is preferred that the alignment operation should be executed as quickly as possible (within a predetermined time) after the internal combustion engine rotating state is established.

(5) In the second embodiment described above, the alignment control section 77 determines completion of the axis adjustment on the basis of both the first determination condition and the second determination condition, and determines completion of the axis adjustment in the case where at least one of the conditions is established. However, the present invention is not limited thereto. That is, in one preferred embodiment of the present invention, the alignment control section 77 may be configured to determine completion of the axis adjustment on the basis of only one of the first determination condition and the second determination condition, for example. In this case, the alignment control section 77 may be configured to monitor only the rotational speed of the first rotary electric machine MG1, and to determine completion of the axis adjustment when the amount of variation in rotational speed of the first rotary electric machine MG1 becomes equal to or more than a predetermined rotation variation determination threshold, for example.

(6) In each of the embodiments described above, the alignment control is executed when the internal combustion engine start condition is established during travel in the electric travel mode and mode switching is made from the electric travel mode to the hybrid travel mode. However, application of the present invention is not limited to such an occasion. That is, the alignment control may also be executed on an occasion where the internal combustion engine start condition is established with the vehicle stationary and the vehicle is started using torque of the internal combustion engine E after execution of the synchronized engagement control and then the internal combustion engine start control. Even in such a case, as in each of the embodiments described above, execution of the alignment control can suppress continuation of an eccentric state of the intermediate member M and the input member I on both sides of the friction engagement device CL even in the case where such an eccentric state is caused.

(7) In each of the embodiments described above, the intermediate member M is formed by the second coupling member 42 and the damper device DA splined to each other, the axis of each of the input member I and the second coupling member 42 is maintained at a favorable accuracy at all times via a bearing, and only the damper device DA moves vertically downward to become eccentric with the rotational speed of the intermediate member M being zero. However, the present invention is not limited thereto. That is, the axis of at least one of the input member I and the intermediate member M may be tilted with the rotational speed of the at least one member being zero so that the input member I and the intermediate member M may become eccentric with respect to each other, depending on the shaft support structure for each of the input member I and the intermediate member M. Hence, also in such a case, the alignment control such as that described in relation to each of the embodiments described above can be executed to suppress continuation of an eccentric state of the intermediate member M and the input member I.

(8) In each of the embodiments described above, the friction engagement device CL is formed as a dry single-plate clutch mechanism including a motor-driven clutch release mechanism. However, the present invention is not limited thereto. That is, the specific configuration of the friction engagement device CL may be determined as desired. In one preferred embodiment of the present invention, the friction engagement device CL may be formed as a dry single-plate clutch mechanism including a hydraulically-driven or electromagnetically-driven clutch release mechanism, for example. In this case, it is preferred to use a hydraulic actuator of various types such as a hydraulic cylinder or an electromagnetic actuator of various types such as a solenoid in place of the drive motor 31 in each of the embodiments described above. In an alternative preferred embodiment of the present invention, the friction engagement device CL may be formed as a wet multi-plate clutch mechanism of a hydraulically-driven type, an electromagnetically-driven type, or the like.

(9) In each of the embodiments described above, the first rotary electric machine MG1 is drivably coupled to the first rotary element E1 of the differential gear device DG, the intermediate member M and the internal combustion engine E are drivably coupled to the second rotary element E2, and the output member O and the second rotary electric machine MG2 are drivably coupled to the third rotary element E3. However, the present invention is not limited thereto. That is, in one preferred embodiment of the present invention, the first rotary electric machine MG1 may be drivably coupled to the first rotary element E1 of the differential gear device DG, the output member O and the second rotary electric machine MG2 may be drivably coupled to the second rotary element E2, and the intermediate member M and the internal combustion engine E may be drivably coupled to the third rotary element E3, for example. In this case, unlike each of the embodiments described above, the hybrid travel mode in which the vehicle is run using both torque of the internal combustion engine E and torque of the rotary electric machines MG1 and MG2 is basically implemented as a torque converter mode in which torque obtained by amplifying output torque of the internal combustion engine E is transferred to the output member O. Also in such a configuration, the alignment control can be executed to suppress continuation of an eccentric state of the intermediate member M and the input member I.

Also in such a configuration, the internal combustion engine start control and the rotational speed control for the first rotary electric machine MG1 are executed at the same time so that the direction of torque of the first rotary electric machine MG1 is inverted between before and after the internal combustion engine E is started to start self-sustained operation. In this case, however, unlike each of the embodiments described above, in contrast to causing the first rotary electric machine MG1 to output torque in the negative direction to reduce the rotational speed of the first rotary electric machine MG1 in order to raise the rotational speed of the internal combustion engine E before the internal combustion engine E is started, the first rotary electric machine MG1 is caused to output torque in the positive direction to make the rotational speed of the first rotary electric machine MG1 coincide with the target rotational speed after the internal combustion engine E is started. Thus, it is preferred that the alignment control section 77 should be configured to detect the time point at which the direction of torque of the first rotary electric machine MG1 is inverted from the negative direction to the positive direction and to start the alignment operation when such torque inversion is detected.

(10) In each of the embodiments described above, the differential gear device DG is formed by a planetary gear mechanism of a single pinion type. However, the present invention is not limited thereto. That is, the differential gear device DG may be formed by a planetary gear mechanism of a double pinion type or a planetary gear mechanism of a Ravigneaux type. In the case where the differential gear device DG includes four or more rotary elements, the differential gear device DG may be formed by two or more planetary gear mechanisms, rotary elements of which are coupled to each other, for example.

Figure 12:
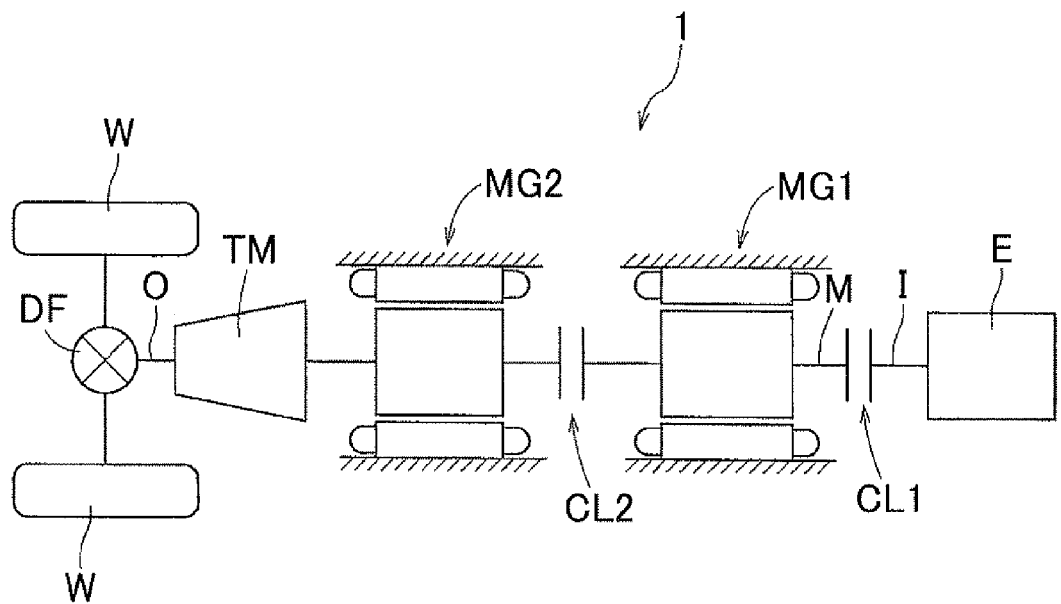
FIG. 12 is a skeleton diagram showing the mechanical configuration of a vehicle drive device according to another embodiment.

(11) In each of the embodiments described above, the vehicle drive device 1 is formed as a drive device for a hybrid vehicle of a so-called 2-motor split type. However, the present invention is not limited thereto. That is, in one preferred embodiment of the present invention, the vehicle drive device 1 may be formed as a drive device for a hybrid vehicle of a so-called 2-motor series/parallel type, for example. In this case, as shown in FIG. 12, the vehicle drive device 1 includes the input member I drivably coupled to the internal combustion engine E, the intermediate member M drivably coupled to the first rotary electric machine MG1, the output member O drivably coupled to the wheels W, and a first friction engagement device CL1 provided on a power transfer path connecting between the input member I and the output member O and capable of releasing the drivable connection between the input member I and the intermediate member M. A second friction engagement device CL2, the second rotary electric machine MG2, and a speed change mechanism TM are provided on a power transfer path connecting between the first rotary electric machine MG1 and the output member O, and arranged in this order from the first rotary electric machine MG1 side. In this case, the first rotary electric machine MG1 corresponds to the "rotary electric machine" according to the present invention, and the first friction engagement device CL1 corresponds to the "friction engagement device" according to the present invention.

Such a vehicle drive device 1 can control the state of engagement of the first friction engagement device CL1 and the second friction engagement device CL2 to enable the vehicle to travel in one of a series travel mode and a parallel travel mode serving as the hybrid travel mode and the electric travel mode with one motor or with two motors. Then, the thus configured vehicle drive device 1 can also suppress continuation of an eccentric state of the intermediate member M and the input member I by executing the alignment control in the case where mode switching is made to the series travel mode by bringing the first friction engagement device CL1 into synchronized engagement to start the internal combustion engine E using torque of the first rotary electric machine MG1 during travel in the electric travel mode with one motor in which the vehicle is run using only torque of the second rotary electric machine MG2, for example.

Figure 13:
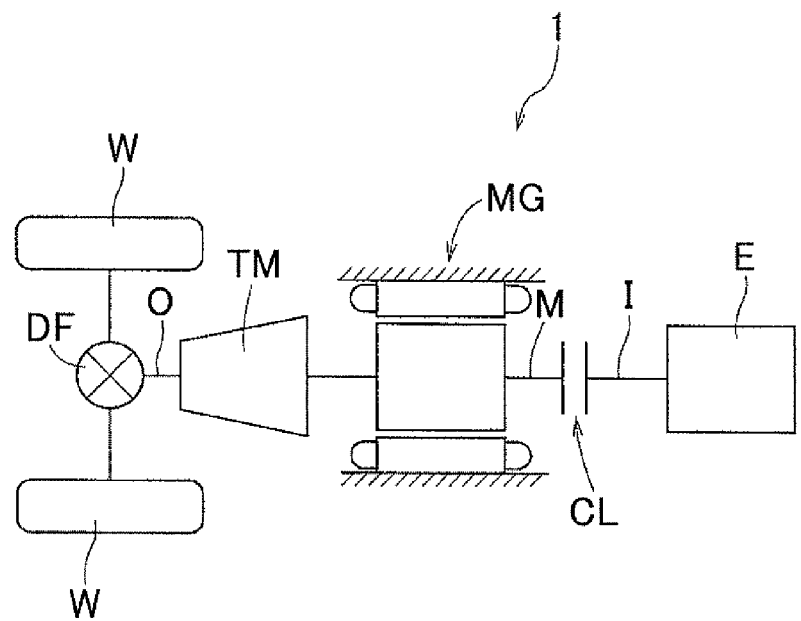
FIG. 13 is a skeleton diagram showing the mechanical configuration of a vehicle drive device according to another embodiment.

(12) In an alternative preferred embodiment of the present invention, the vehicle drive device 1 may be formed as a drive device for a hybrid vehicle of a so-called 1-motor parallel type. In this case, as shown in FIG. 13, the vehicle drive device 1 includes the input member I drivably coupled to the internal combustion engine E, the intermediate member M drivably coupled to a rotary electric machine MG, the output member O drivably coupled to the wheels W, and the friction engagement device CL capable of releasing the drivable connection between the input member I and the intermediate member M. In addition, the speed change mechanism TM is provided on a power transfer path connecting between the rotary electric machine MG and the output member O.

Such a vehicle drive device 1 can control the state of engagement of the friction engagement device CL to enable the vehicle to travel in one of the parallel travel mode serving as the hybrid travel mode and the electric travel mode. Then, the thus configured vehicle drive device 1 can also suppress continuation of an eccentric state of the intermediate member M and the input member I by executing the alignment control in the case where the vehicle is started in the parallel travel mode by bringing the friction engagement device CL into synchronized engagement to start the internal combustion engine E using torque of the rotary electric machine MG while the vehicle is stationary, for example.

The configurations described with reference to FIGS. 12 and 13 are suitable for the vehicle drive device 1 to be mounted on FR (Front-Engine Rear-Drive) vehicles, for example.

(13) In each of the embodiments described above, the internal combustion engine control unit 3 is provided separately from the control device 70. However, the present invention is not limited thereto. That is, the internal combustion engine control unit 3 may be integrated in the control device 70. The configuration of the functional sections described in relation to the embodiments described above is merely illustrative, and a plurality of functional sections may be combined with each other, or a single functional section may be further divided into sub-sections.

(14) Also regarding other configurations, the embodiments disclosed herein are illustrative in all respects, and the present invention is not limited thereto. That is, a configuration not described in the claims of the present invention may be altered without departing from the object of the present invention.

The present invention may be suitably applied to a vehicle drive device including an input member drivably coupled to an internal combustion engine, an output member drivably coupled to wheels, an intermediate member provided on a power transfer path connecting between the input member and the output member and drivably coupled to a rotary electric machine, a friction engagement device capable of releasing drivable connection between the input member and the intermediate member, and a control device.

What is claimed is:

1. A vehicle drive device including an input member drivably coupled to an internal combustion engine, an output member drivably coupled to wheels, an intermediate member provided on a power transfer path connecting between the input member and the output member and drivably coupled to a first rotary electric machine, a friction engagement device capable of releasing drivable connection between the input member and the intermediate member, and a control device, wherein
the control device includes:
  a synchronized engagement control section that, when an internal combustion engine start condition for starting the internal combustion engine which has been stationary is established with the friction engagement device in a disengaged state, engages the friction engagement device in a synchronized state, in which a rotational speed difference between the input member and the intermediate member is equal to or less than a predetermined value, to bring the friction engagement device into a directly engaged state;
  a start control section that raises a rotational speed of the input member using torque of the first rotary electric machine with the friction engagement device in the directly engaged state to start the internal combustion engine; and
  an alignment control section that, in an internal combustion engine rotating state in which a rotational speed of the internal combustion engine is equal to or more than a predetermined value, performs alignment operation in which an engagement pressure of the friction engagement device is reduced and in which the friction engagement device is returned to the directly engaged state upon detecting that the rotational speed difference reaches a rotation difference threshold.

2. The vehicle drive device according to claim 1, wherein the alignment control section performs the alignment operation after torque of the internal combustion engine becomes equal to or more than a predetermined value.

3. The vehicle drive device according to claim 2, wherein:
the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed; and
the alignment control section detects torque inversion in which a direction of torque of the first rotary electric machine is inverted during execution of the rotational speed control for the first rotary electric machine to start the alignment operation when the torque inversion is detected.

4. The vehicle drive device according to claim 3, further comprising:
a differential gear device including a first rotary element, a second rotary element, and a third rotary element in the order of rotational speed, wherein:
the first rotary electric machine is drivably coupled to the first rotary element, the intermediate member is drivably coupled to the second rotary element, and the output member is drivably coupled to the third rotary element, via no other rotary element of the differential gear device;
the control device further includes a torque maintenance control section that outputs a torque maintenance command for the first rotary electric machine and the internal combustion engine to maintain torque of the first rotary electric machine and torque of the internal combustion engine at respective constant values that are not varied over time; and
the alignment control section performs the alignment operation with both torque of the first rotary electric machine and torque of the internal combustion engine maintained at the respective constant values.

5. The vehicle drive device according to claim 3, further comprising:
a differential gear device including a first rotary element, a second rotary element, and a third rotary element in the order of rotational speed; and
a second rotary electric machine, wherein:
the first rotary electric machine is drivably coupled to the first rotary element, the intermediate member is drivably coupled to the second rotary element, and the output member and the second rotary electric machine are drivably coupled to the third rotary element, via no other rotary element of the differential gear device;
the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed, and a second rotary electric machine control section that controls operation of the second rotary electric machine;
the first rotary electric machine control section continuously executes the rotational speed control for the first rotary electric machine during the alignment operation; and
the second rotary electric machine control section controls the second rotary electric machine such that torque transferred to the output member becomes torque corresponding to a required drive force for driving a vehicle, and controls the second rotary electric machine so as to correct variations in torque transferred to the output member along with the rotational speed control for the first rotary electric machine during the alignment operation.

6. The vehicle drive device according to claim 1, wherein:
the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed; and
the alignment control section detects torque inversion in which a direction of torque of the first rotary electric machine is inverted during execution of the rotational speed control for the first rotary electric machine to start the alignment operation when the torque inversion is detected.

7. The vehicle drive device according to claim 6, further comprising:
a differential gear device including a first rotary element, a second rotary element, and a third rotary element in the order of rotational speed, wherein:
the first rotary electric machine is drivably coupled to the first rotary element, the intermediate member is drivably coupled to the second rotary element, and the output member is drivably coupled to the third rotary element, via no other rotary element of the differential gear device;
the control device further includes a torque maintenance control section that outputs a torque maintenance command for the first rotary electric machine and the internal combustion engine to maintain torque of the first rotary electric machine and torque of the internal combustion engine at respective constant values that are not varied over time; and
the alignment control section performs the alignment operation with both torque of the first rotary electric machine and torque of the internal combustion engine maintained at the respective constant values.

8. The vehicle drive device according to claim 6, further comprising:
a differential gear device including a first rotary element, a second rotary element, and a third rotary element in the order of rotational speed; and
a second rotary electric machine, wherein:
the first rotary electric machine is drivably coupled to the first rotary element, the intermediate member is drivably coupled to the second rotary element, and the output member and the second rotary electric machine are drivably coupled to the third rotary element, via no other rotary element of the differential gear device;
the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed, and a second rotary electric machine control section that controls operation of the second rotary electric machine;
the first rotary electric machine control section continuously executes the rotational speed control for the first rotary electric machine during the alignment operation; and
the second rotary electric machine control section controls the second rotary electric machine such that torque transferred to the output member becomes torque corresponding to a required drive force for driving a vehicle, and controls the second rotary electric machine so as to correct variations in torque transferred to the output member along with the rotational speed control for the first rotary electric machine during the alignment operation.

9. The vehicle drive device according to claim 1, further comprising:
a differential gear device including a first rotary element, a second rotary element, and a third rotary element in the order of rotational speed, wherein:
the first rotary electric machine is drivably coupled to the first rotary element, the intermediate member is drivably coupled to the second rotary element, and the output member is drivably coupled to the third rotary element, via no other rotary element of the differential gear device;
the control device further includes a torque maintenance control section that outputs a torque maintenance command for the first rotary electric machine and the internal combustion engine to maintain torque of the first rotary electric machine and torque of the internal combustion engine at respective constant values that are not varied over time; and
the alignment control section performs the alignment operation with both torque of the first rotary electric machine and torque of the internal combustion engine maintained at the respective constant values.

10. The vehicle drive device according to claim 1, further comprising:
a differential gear device including a first rotary element, a second rotary element, and a third rotary element in the order of rotational speed; and
a second rotary electric machine, wherein:
the first rotary electric machine is drivably coupled to the first rotary element, the intermediate member is drivably coupled to the second rotary element, and the output member and the second rotary electric machine are drivably coupled to the third rotary element, via no other rotary element of the differential gear device;
the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed, and a second rotary electric machine control section that controls operation of the second rotary electric machine;
the first rotary electric machine control section continuously executes the rotational speed control for the first rotary electric machine during the alignment operation; and
the second rotary electric machine control section controls the second rotary electric machine such that torque transferred to the output member becomes torque corresponding to a required drive force for driving a vehicle, and controls the second rotary electric machine so as to correct variations in torque transferred to the output member along with the rotational speed control for the first rotary electric machine during the alignment operation.

11. The vehicle drive device according to claim 2, further comprising:
a differential gear device including a first rotary element, a second rotary element, and a third rotary element in the order of rotational speed, wherein:
the first rotary electric machine is drivably coupled to the first rotary element, the intermediate member is drivably coupled to the second rotary element, and the output member is drivably coupled to the third rotary element, via no other rotary element of the differential gear device;
the control device further includes a torque maintenance control section that outputs a torque maintenance command for the first rotary electric machine and the internal combustion engine to maintain torque of the first rotary electric machine and torque of the internal combustion engine at respective constant values that are not varied over time; and the alignment control section performs the alignment operation with both torque of the first rotary electric machine and torque of the internal combustion engine maintained at the respective constant values.

12. The vehicle drive device according to claim 2, further comprising:
a differential gear device including a first rotary element, a second rotary element, and a third rotary element in the order of rotational speed; and
a second rotary electric machine, wherein:
the first rotary electric machine is drivably coupled to the first rotary element, the intermediate member is drivably coupled to the second rotary element, and the output member and the second rotary electric machine are drivably coupled to the third rotary element, via no other rotary element of the differential gear device;
the control device further includes a first rotary electric machine control section that, in starting the internal combustion engine, performs rotational speed control in which a command for a target rotational speed is provided to the first rotary electric machine to make a rotational speed of the first rotary electric machine coincide with the target rotational speed, and a second rotary electric machine control section that controls operation of the second rotary electric machine;
the first rotary electric machine control section continuously executes the rotational speed control for the first rotary electric machine during the alignment operation; and
the second rotary electric machine control section controls the second rotary electric machine such that torque transferred to the output member becomes torque corresponding to a required drive force for driving a vehicle, and controls the second rotary electric machine so as to correct variations in torque transferred to the output member along with the rotational speed control for the first rotary electric machine during the alignment operation.

* * * * *